United States Patent
Srivastava et al.

(10) Patent No.: US 11,800,346 B2
(45) Date of Patent: Oct. 24, 2023

(54) DUAL ACCESS AND MOBILITY MANAGEMENT FUNCTION SUPPORT FOR SUPPORTING OPTIMIZED 5G CORE DEPLOYMENTS

(71) Applicant: Cisco Technology, Inc., San Jose, CA (US)

(72) Inventors: Vimal Srivastava, Bangalore (IN); Sangram Kishore Lakkaraju, Bangalore (IN); Anal Srivastava, Cupertino, CA (US); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 186 days.

(21) Appl. No.: 17/358,193

(22) Filed: Jun. 25, 2021

(65) Prior Publication Data

US 2022/0417726 A1    Dec. 29, 2022

(51) Int. Cl.
*H04W 8/12* (2009.01)
*H04W 48/18* (2009.01)
*H04W 60/04* (2009.01)

(52) U.S. Cl.
CPC ............. *H04W 8/12* (2013.01); *H04W 48/18* (2013.01); *H04W 60/04* (2013.01)

(58) Field of Classification Search
CPC ........ H04W 8/12; H04W 48/18; H04W 60/04
See application file for complete search history.

(56) References Cited

U.S. PATENT DOCUMENTS

| | | | |
|---|---|---|---|
| 2019/0357129 A1 | 11/2019 | Park et al. | |
| 2020/0008139 A1* | 1/2020 | Lai | H04W 48/16 |
| 2020/0077327 A1* | 3/2020 | Duan | H04W 72/56 |
| 2020/0120590 A1 | 4/2020 | Trivisonno et al. | |
| 2020/0137675 A1 | 4/2020 | Park et al. | |
| 2020/0178167 A1 | 6/2020 | Jia et al. | |
| 2020/0187061 A1* | 6/2020 | Zhu | H04L 67/14 |
| 2021/0084582 A1* | 3/2021 | Li | H04L 41/0894 |
| 2021/0185631 A1* | 6/2021 | Deng | H04W 12/037 |
| 2022/0303934 A1* | 9/2022 | Ianev | H04W 60/005 |

FOREIGN PATENT DOCUMENTS

CN     109257815 A    1/2019

\* cited by examiner

*Primary Examiner* — Charles N Appiah
*Assistant Examiner* — Nicole M Louis-Fils
(74) *Attorney, Agent, or Firm* — Edell, Shapiro & Finnan, LLC

(57) ABSTRACT

A first access and mobility management function (AMF) in a network receives, from user equipment (UE), a registration request listing a first network slice and a second network slice. Upon determining that the first AMF supports the first, but not the second, network slice, the first AMF causes selection of (i) the first AMF as a session and mobility management (SM)-AMF to perform mobility management, and first session management signaling for the first network slice; and (ii) a second AMF as a session management only (SO)-AMF to perform only second session management signaling for the second network slice. The first AMF, acting as SM-AMF, performs the first session management signaling for a first data session on the first network slice, while the second AMF, acting as SO-AMF, performs only the second session management signaling for a second data session on the second network slice.

20 Claims, 19 Drawing Sheets

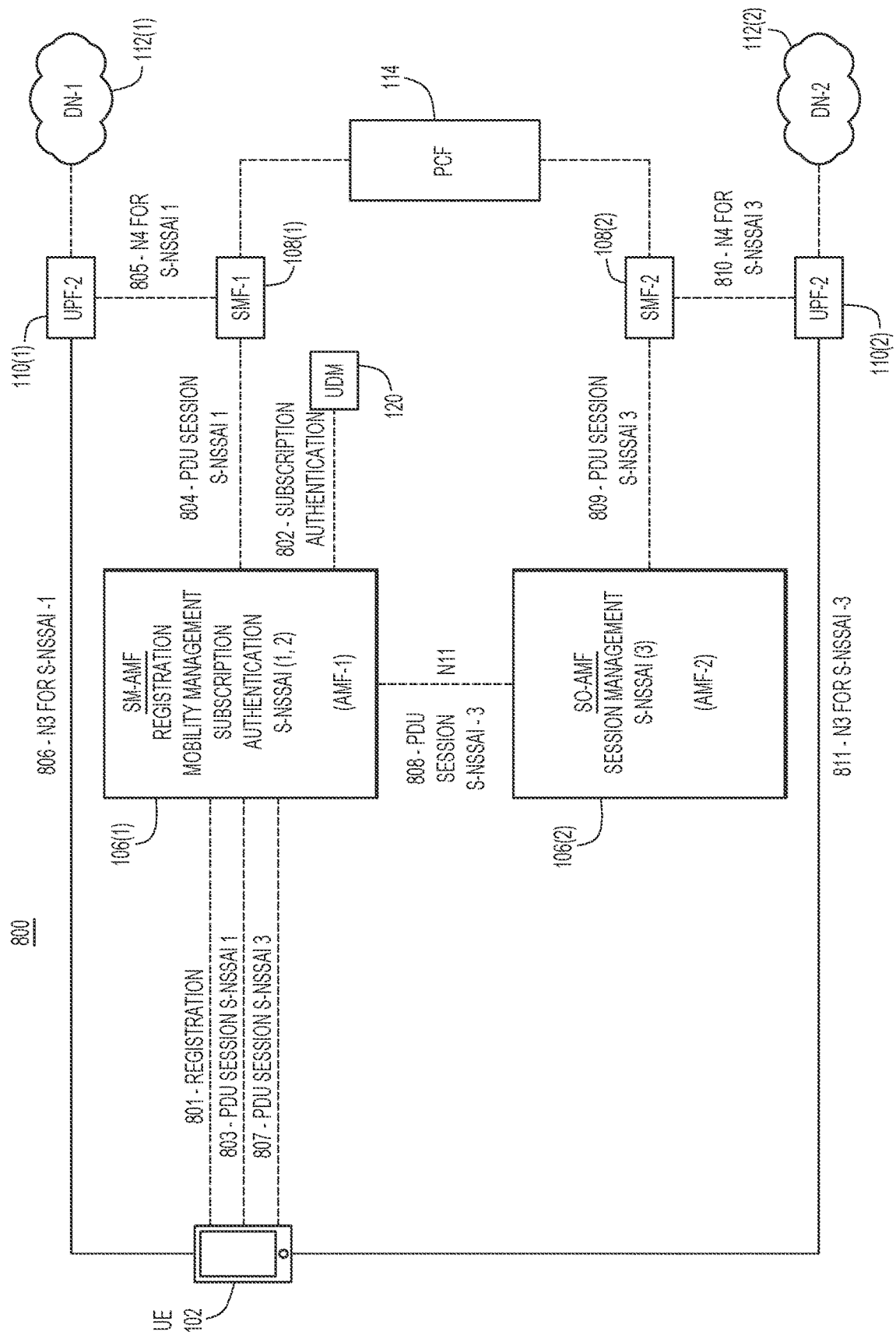

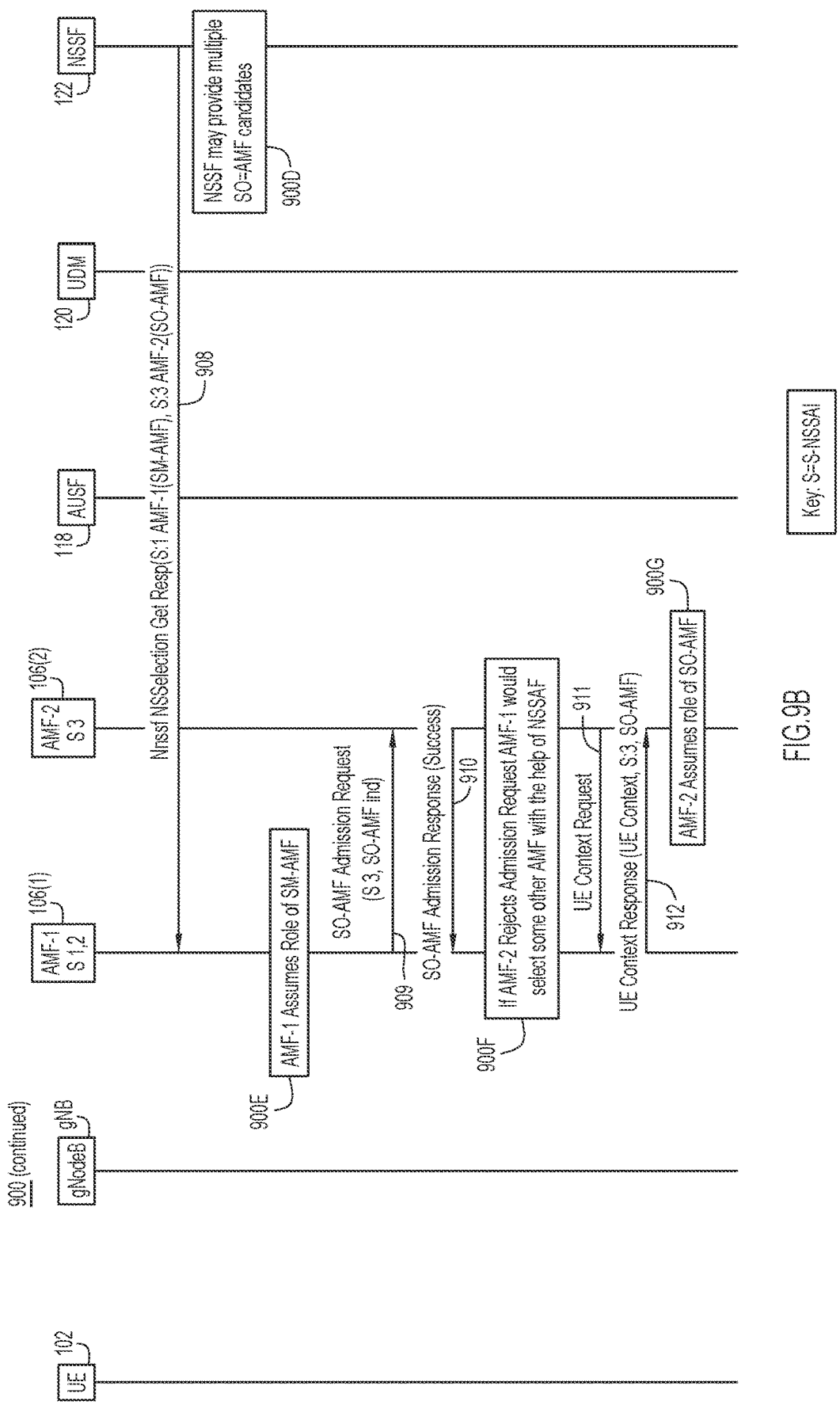

DUAL ACCESS AND MOBILITY MANAGEMENT FUNCTION SUPPORT FOR SUPPORTING OPTIMIZED 5G CORE DEPLOYMENTS

TECHNICAL FIELD

The present disclosure relates to dual access and mobility management function (AMF) support in a network.

BACKGROUND

In the 3rd Generation Partnership Project (3GPP)/fifth generation (5G) architecture, mobility management for the user equipment (UE)/mobile device is managed by the access and mobility management function (AMF). The AMF manages and tracks the mobility, registration, connection management, certain session management operations, and other related states for the UE. A key limitation in the current 3GPP/5G architecture is that the UE is always served by a single AMF function at any given time. The UE may have multiple protocol data unit (PDU) sessions on different data network names (DNNs), multiple session management function (SMF) session anchors, multiple user plane function (UPF) anchors, and single/dual connectivity; however, there is always a single AMF that handles a given mobility management state for the UE at any given time. That is, the UE on 3GPP/5G (also referred to simply as "5G") access cannot be served by multiple AMFs at the same time.

BRIEF DESCRIPTION OF THE DRAWINGS

FIG. 8 is an illustration of a high-level call flow for operations described in connection with FIGS. 5A-7B, according to an example embodiment.

FIGS. 9A and 9B show a call flow for triggering and performing a mobility and session management (SM)-AMF/session management only (SO)-AMF (SM-AMF/SO-AMF) selection procedure, according to an example embodiment.

DESCRIPTION OF EXAMPLE EMBODIMENTS

Overview

A first access and mobility management function (AMF) in a network performs a method. The AMF receives, from user equipment (UE), a registration request listing a first network slice and a second network slice. Upon determining that the first AMF supports the first network slice, but not the second network slice, the AMF selects, for the UE, (i) the first AMF as a session and mobility management (SM)-AMF to perform mobility management, and first session management signaling for the first network slice served by the first AMF, and (ii) a second AMF as a session management only (SO)-AMF to perform only second session management signaling for the second network slice served by the second AMF. The first AMF, acting as SM-AMF, performs the first session management signaling with a first session management function (SMF) for a first data session on the first network slice, while the second AMF, acting as SO-AMF, performs the second session management signaling with a second SMF for a second data session on the second network slice, to provide the UE with access to the first network slice and the second network slice, concurrently.

EXAMPLE EMBODIMENTS

Figure 1:
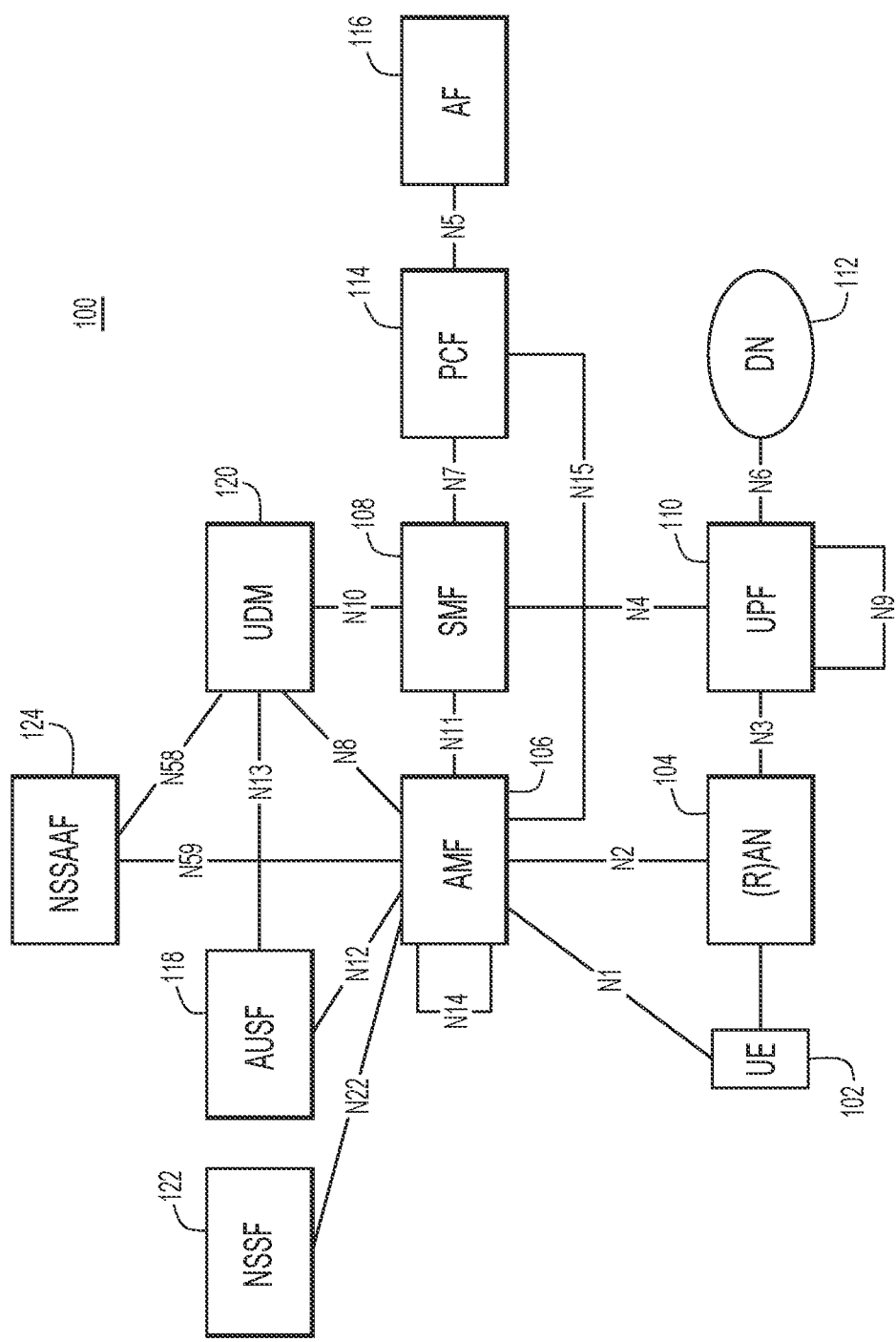
FIG. 1 is an illustration of a 5G wireless network in which embodiments presented herein may be implemented, according to an example embodiment.

FIG. 1 is an illustration of a 5G wireless network 100 in which embodiments presented herein may be implemented. The network 100 may include a number of network nodes and/or entities, such as a user equipment (UE) device 102 (referred to simply as "UE" or "the UE"), e.g., a mobile telephone. It will be appreciated that the network 100 typically includes multiple UE devices; however, one UE is depicted for simplicity.

The network 100 may include an access network 104, which may be implemented as one or more of an evolved universal mobile telecommunications system (UMTS) terrestrial radio access network (E-UTRAN), a radio area network (RAN), and/or a next generation radio area network (NG-RAN) (each more generally referred to as a "RAN"). The access network 104 may include one or more eNodeB (eNB) entities and/or one or more next generation NodeB (gNB) devices. The eNB and gNB entities (each more generally referred to as a "gNB") may communicate with one another via one or more X2 (referred to as "Xn" in 5G) interfaces.

UE 102 102 may communicate with access and mobility management function (AMF) 106 via the access network 104. The AMF 106 may communicate control signaling (e.g., non-access stratum (NAS) signaling) with UE 102 using an N1 interface. The AMF 106 may communicate control signaling with the access network using an N2 interface. The AMF 106 may facilitate communication by other network functions with UE 102 and/or the access network 104. For example, other network functions may subscribe to notifications regarding mobility events relating to UE 102. The AMF 106 may support termination of non-access stratum (NAS) signaling, NAS ciphering and integrity protection, registration management, connection management, and/or mobility management. The AMF 106 may support access, authentication, and authorization (AAA) and/or security context management.

The AMF 106 may communicate control signaling with a session management function (SMF) 108 using an N11 interface. The SMF 108 may support session establishment, modification, and/or release. The SMF 108 may allocate and manage the allocation of an internet protocol (IP) address to UE 102. The SMF 108 may support dynamic host configuration protocol (DHCP) functions. The SMF 108 may support termination of NAS signaling related to session management. The SMF 108 may support traffic steering configuration for one or more user plane function (UPF) entities 110. When multiple AMFs are present, they may communicate with each other over one or more N14 interfaces.

One or more UPF entities 110 may communicate control signaling with the SMF 108 using an N4 interface. If multiple UPF entities are present, they may communicate control signaling with each other using one or more N9 interfaces. The one or more UPF entities 110 may communicate data signaling with the access network 104 using an N3 interface. The one or more UPF entities 110 may support packet routing and forwarding, packet inspection, and handling of quality of service (QoS). The one or more UPF entities 110 may act as an external protocol data unit (PDU) session point of interconnect to a data network (DN) 112, such as the Internet. The one or more UPF entities 110 may communicate data signaling with the DN 112 using an N6 interface. The one or more UPF entities 110 may serve as an anchor point for mobility within and between radio access technologies (RATs).

A policy control function (PCF) 114 may communicate control signaling with the SMF 108 using an N7 interface. The PCF 114 may communicate control signaling with the AMF 106 using an N15 interface. The PCF 114 may provide policy rules to other control plane entities. The PCF 114 may provide access subscription information for policy decisions in a unified data repository, for example.

An application function (AF) 116 may communicate control signaling with the PCF 114 using an N5 interface. The AF 116 may support application influence on traffic routing. The AF 116 may interact with the PCF 114 to provide policy control. In the ensuing description, control signaling, data signal, and NAS signaling may be referred to more generally as "signaling."

An authentication server function (AUSF) 118 performs authentication services requested by the AMF 106 over an N12 interface to assist the AMF with authentication of UE 102.

A unified data management (UDM) function 120 performs UE-related operations including user identification handling, subscription management, user authentication, and access authorization for roaming. UDM function 120 communicates with the AMF 106, the SMF 108, and AUSF 118 over N8, N10, and N13 interfaces, respectively.

A network slice selection function (NSSF) 122 maintains a list of operator defined network slice instances. A network slice includes a logical set of network functions configured to implement a service for UE 102. For example, a first network slice may comprise a first set of UPF, SMF, and PCF entities configured to provide UE 102 with connectivity to the Internet, i.e., Internet service. A second network slice may comprise a second set of UPF, SMF, and PCF entities configured to provide UE 102 with audio-video call service, and so on. The AMF 106 authorizes use of network slices based on the subscription information stored in the UDM 120, or the AMF can query NSSF 122 to authorize access to a network slice based on service requirements, in which case the NSSF directs traffic to an intended network slice. NSSF 122 communicates with the AMF 106 over an N22 interface.

A network slice specific authentication and authorization function (NSSAAF) 124 performs authentication services with respect to specific network slices. The NSSAAF 124 communicates with the UDM 120 and the AMF 106 over N59 and N58 interfaces, respectively.

Only single instances of the various functions are shown in FIG. 1 for simplicity; however, in practice, there may be many instances of each of the various functions, e.g., multiple AMFs, multiple SMFs, multiple UPFs, and so on.

According to the embodiments presented herein, a UE (e.g., UE 102) is concurrently served by two/dual AMFs that support the UE in different, but complementary, roles. The two AMFs include (1) a mobility and session management (SM) AMF, designated "SM-AMF," and (2) a session management only (SO) AMF, designated "SO-AMF." The SM-AMF operates in a full-AMF role to handle UE registration (primary authentication, subscription and mobility management) and interacts with a corresponding SMF for PDU session management for first network slices (i.e., Single-Network Slice Selection Assistance Information (S-NSSAI(s))) supported by/allocated to the SM-AMF. An S-NSSAI uniquely identifies a network slice. On the other hand, the SO-AMF operates in a limited-AMF role that only interacts with a corresponding SMF for PDU session establishment for second network slices supported by the SO-AMF and that are not supported by the SM-AMF. After the UE is registered using the SM-AMF, when the UE sends a PDU session establishment request for services associated with a network slice, the request is routed to the SO-AMF when the SM-AMF does not support the network slice for that PDU session.

An AMF primarily performs the following functions: registration and primary authentication; network slice specific authentication; security context management; connection management; mobility management; exchanging session management related signaling (also referred to more simply as "session management signaling") with the corresponding SMF for the network slices served by the AMF; and paging the UE. The SM-AMF performs all of the aforementioned functions for a given UE, and may be referred to more generally as a "full-role" AMF. On the other hand, the SO-AMF performs only exchanging session management related signaling with the corresponding SMF for the network slices served by the AMF—for a given UE, and may be referred to more generally as a "limited function" AMF. An AMF configured in accordance with the embodiments presented herein may selectively operate as either an SM-AMF or an SO-AMF, for a given UE. That is, the SM-AMF role and the SO-AMF role performed by the AMF are in the context of a given UE; an SO-AMF for a given UE may be an SM-AMF for some other UE. If required, multiple SO-AMFs may serve different network slices; however, there is a single SM-AMF. Consider an example in which network slices 1, 2, and 3 are served by AMFs AMF1, AMF2, and AMF3, respectively. When a UE requests services from all of network slices 1-3, AMF1 may act as SM-AMF, whereas the other two AMFs (AMF2, AMF3) may assume roles of SO-AMFs.

The embodiments include a dual-AMF or SM-AMF/SO-AMF selection procedure. Upon registration of the UE through an AMF, the AMF may initiate/trigger the SM-AMF/SO-AMF selection procedure, during which the AMF interacts with NSSF 122. The SM-AMF/SO-AMF selection procedure selects an SM-AMF and an SO-AMF for the UE, and notifies the AMF of which AMFs are selected for/designated SM-AMF and SO-AMF. The SM-AMF/SO-AMF selection procedure selects the SM-AMF and the SO-AMF to support the network slices asserted by the UE during registration. The SM-AMF/SO-AMF selection procedure described herein selects one SO-AMF by way of example, only. It is understood that the SM-AMF/SO-AMF selection procedure may result in selection of multiple SO-AMFs, when needed.

In addition, the embodiments take into account first, second, and third (radio) access network/gNB connection configurations respectively referred to as "single gNB and dual N2 interfaces connectivity," "single gNB and single N2 interface connectivity," and "dual connectivity." The three RAN/gNB connection configurations are described briefly.

When the UE connects to the network through a single gNB of access network 104, and the gNB has two N2 interfaces, one to the SM-AMF, and the other to the SO-AMF, this is referred to "single gNB and dual N2 interface connectivity." In this case, after SM-AMF vs. SO-AMF determination/selection is performed using NSSF 122, the SM-AMF identifies the SM-AMF and the SO-AMF, and their supported network slices, to the gNB. Upon receiving NAS signaling from the UE, the gNB delivers the NAS signaling directly to the appropriate one of the SM-AMF and the SO-AMF, depending upon the network slice to be served.

On the other hand, when the UE connects to the network through the single gNB, and the gNB has a single N2 interface to the SM-AMF, but not to the SO-AMF, this is referred to as "single gNB and single N2 interface connectivity." In this case, the gNB forwards all NAS signaling between the UE and the SM-AMF for all network slices. The SM-AMF proxies all NAS signaling from the UE to the SO-AMF for network slices served by the SO-AMF, and all NAS signaling from the SO-AMF toward the UE for the network slices served by the SO-AMF. Note that there may be multiple SO-AMFs, in which case the SM-AMF may act as proxy for all of the SMF-AMFs.

The "dual connectivity" gNB configuration applies when the SM-AMF and the SO-AMF do not have inter-connectivity. The UE is dual connectivity enabled, and thus connects to two gNBs, and each gNodeB connects to a respective AMF that supports respective required/allocated network slices. When the UE establishes a PDU session, depending upon the requested network slice, the gNB will use the AMF serving the network slice.

In the ensuing description of FIGS. 2-10B, the terms "network slice" and "slice" may be used interchangeably. Also, the term "slice" and the 3GPP/5G term for slice "S-NSSAI" may be used interchangeably.

Figure 2:
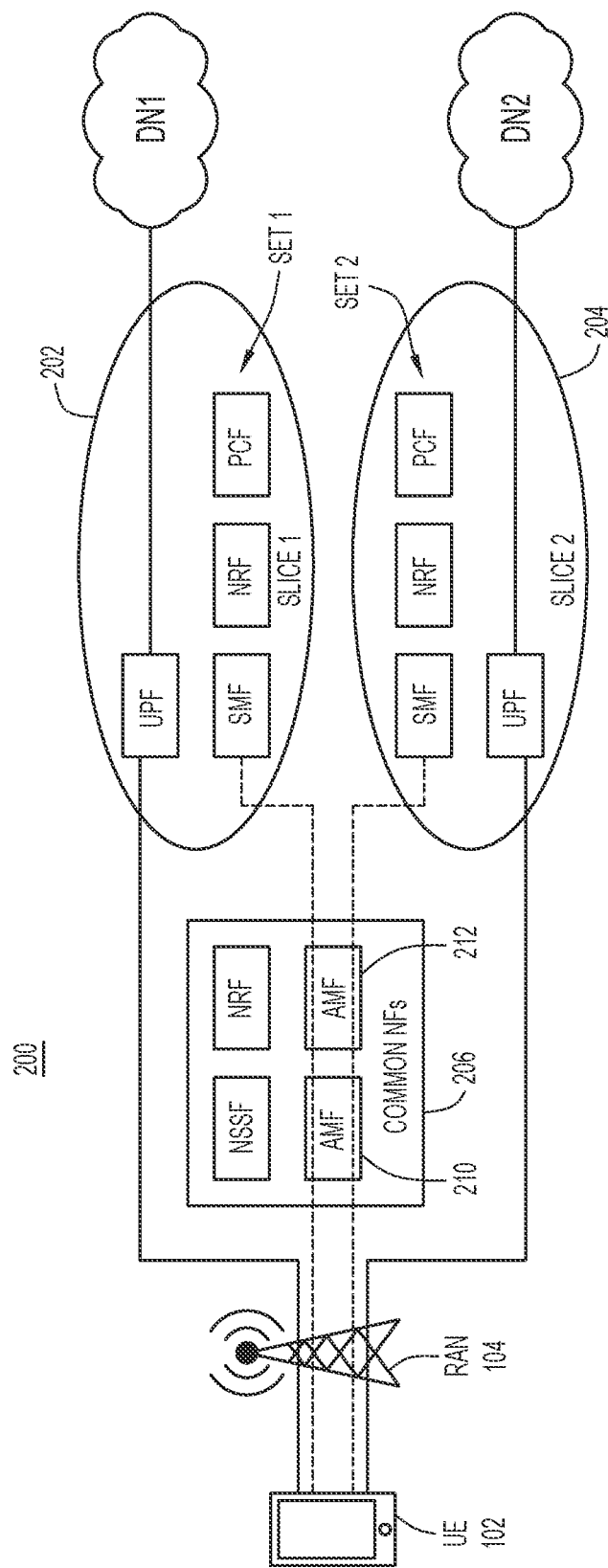
FIG. 2 is a first network configuration served by the embodiments presented herein, according to an example embodiment.
Figure 3:
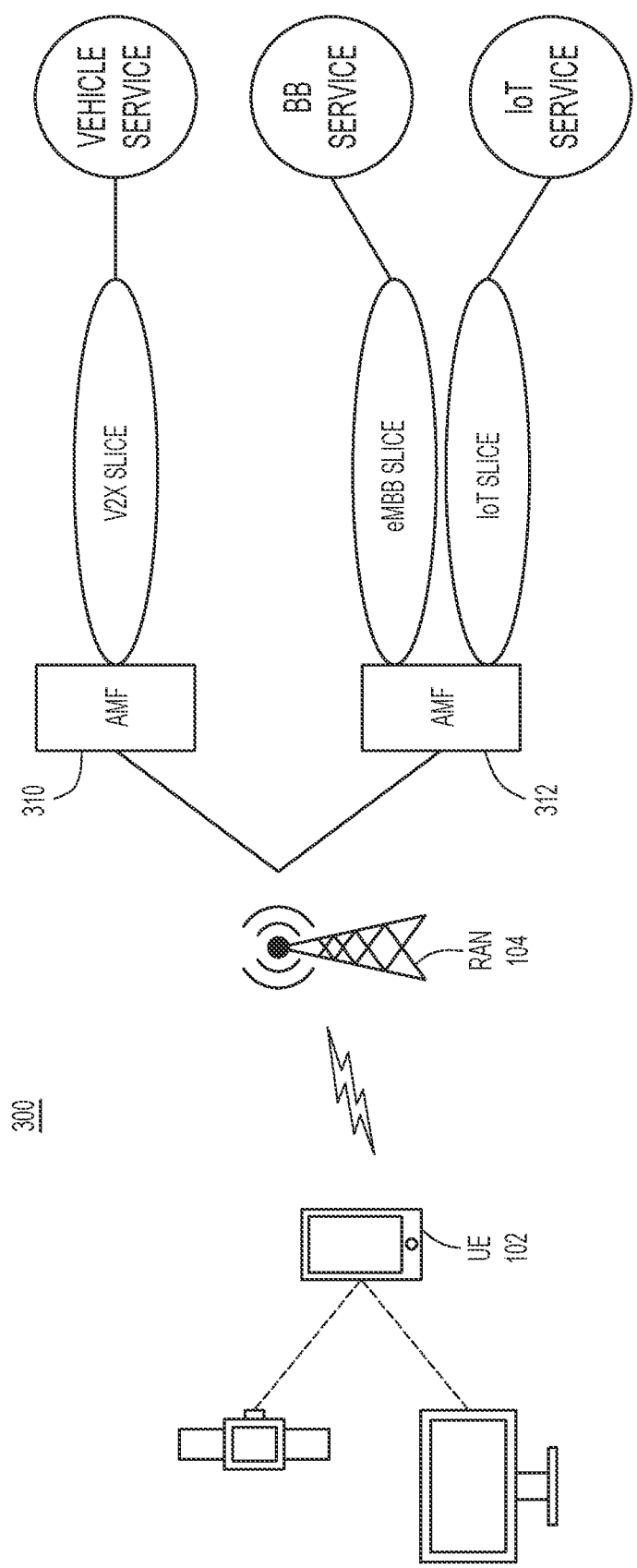
FIG. 3 is a second network configuration served by the embodiments presented herein, according to an example embodiment.
Figure 4:
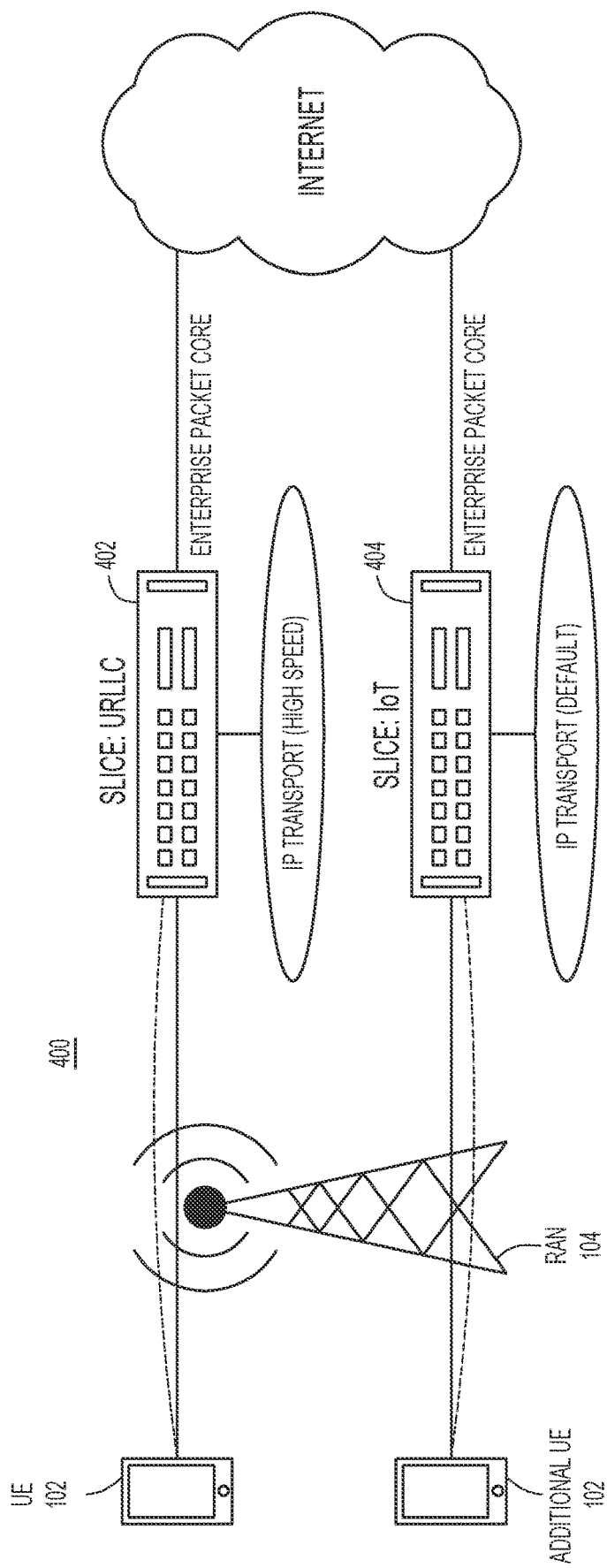
FIG. 4 is a third network configuration served by the embodiments presented herein, according to an example embodiment.

Several use cases or applications of the embodiments are shown in FIGS. 2-4. In FIGS. 2-4, access network 104 is denoted "RAN 104." With reference to FIG. 2, there is an example network configuration 200 served by embodiments presented herein. Network configuration 200 includes a first slice 202 ("slice 1") connected to DN1 and a second slice 204 ("slice 2") connected to DN2. Slice 1 supports a first service and slice 2 supports a second service for UE 102. Slices 1 and 2 comprise respective sets, set 1 and set 2, of SMF, network repository function (NRF), PCF, and UPF entities. The NRF serves as a central repository of network functions (NFs), and maintains a list of available NF instances. Network configuration 200 also includes a common set of NFs 206. NFs 206 include an NSSF, an NRF, an AMF 210 and an AMF 212 that interact with the slices.

Assume that AMF 210 is configured to support only slice 1, and AMF 212 is configured to support only slice 2. Using conventional techniques, UE 102 cannot connect to and use the first service on slice 1 and the second service on slice 2, concurrently, because only one AMF can serve the UE at any given time. To overcome this limitation, embodiments presented here allow both AMF 210 and AMF 212 (one as SM-AMF, the other as SO-AMF) to serve UE 102, concurrently, which allows the UE to access slice 1 and slice 2 supported by the AMFs, concurrently.

With reference to FIG. 3, there is an example network configuration 300 served by embodiments presented herein. In network configuration 300, an operator has deployed three slices that support corresponding services, including a Vehicle to Everything (V2X) slice, an enhanced mobile broadband (eMBB) slice, and an Internet-of-Things (IoT) slice. An AMF 310 only supports the V2X slice, while an AMF 312 only supports the eMBB and IoT slices. UE 102 subscribes to the V2X service and the eMBB service, and requests concurrent access to both services. Using conventional techniques, UE 102 can be served by only one AMF at any given time, and thus can access only the service(s)/slice(s) supported by that AMF, at that time. According to embodiments presented herein, UE 102 can be served concurrently by both AMFs 310 and 312 (one as SM-AMF, the other as SO-AMF), and thus can access both the V2X service and the eMBB service concurrently.

With reference to FIG. 4 there is an example network configuration 400 served by embodiments presented herein. Network configuration 400 includes an integrated function 402 that is configured to support an ultra-reliable low-latency communication (URLLC) slice, and an integrated function 404 that is configured to support an IoT slice. An "integrated function" may comprise 5G network functions integrated or packaged into a compact product, (sometimes referred to herein as a "5G box") to serve a private enterprise. Each 5G box incorporates a respective AMF configured to support the respective slice (e.g., URLLC or IoT, but not both). Using conventional techniques, UE 102 can only connect to one slice at a time because the UE can only be served by one AMF at a time. To overcome this constraint, embodiments presented here allow the AMF in 5G box 402 and the AMF in 5G box 404 to serve UE 102, concurrently, so that the UE can access the corresponding slices/services concurrently.

Single gNB and Dual N2 Interfaces Call Flow

Figure 5A:
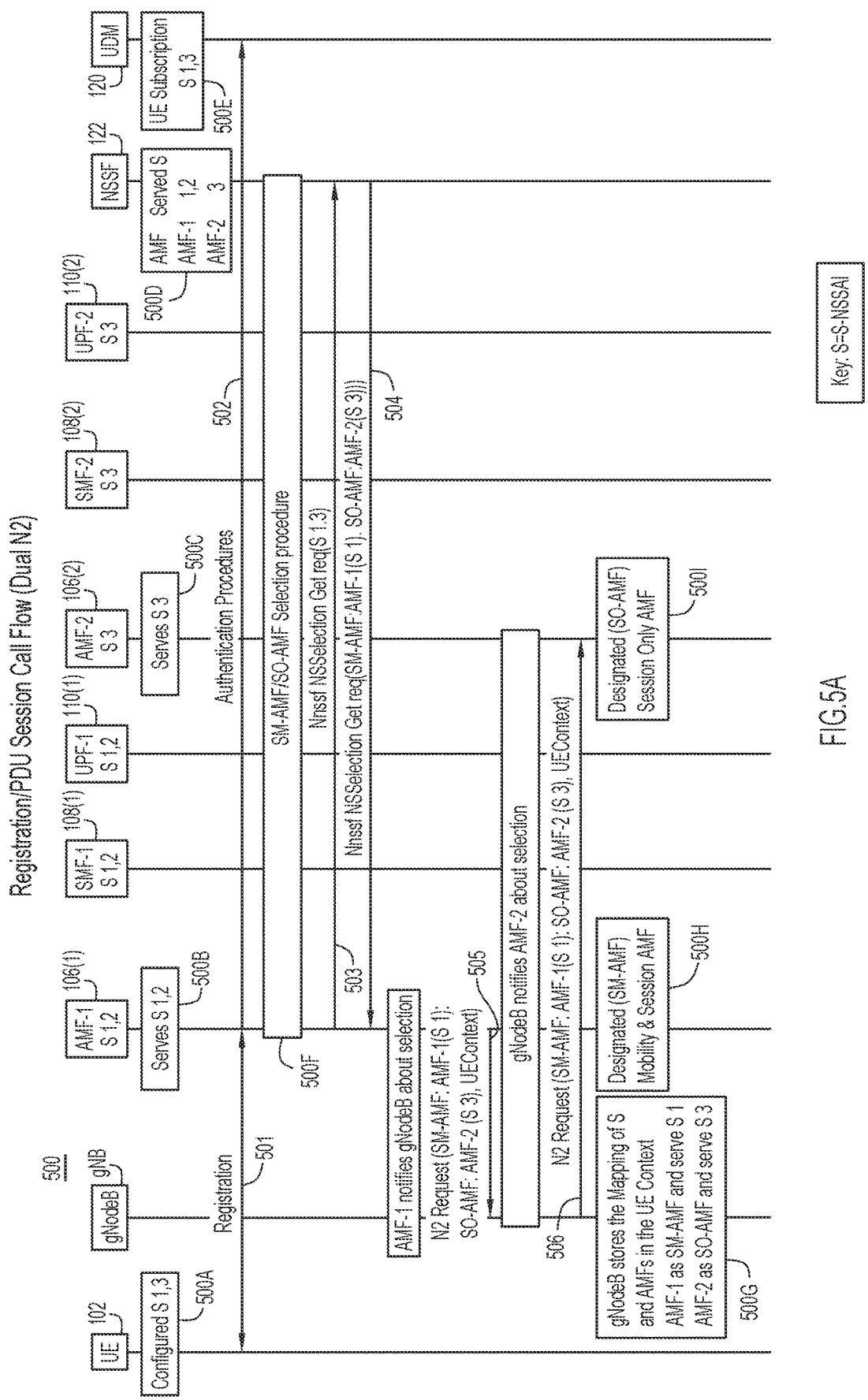
FIGS. 5A and 5B show a call flow for registration and PDU session establishment for a UE using single gNodeB (gNB) and dual N2 interfaces connectivity, according to an example embodiment.
Figure 5B:
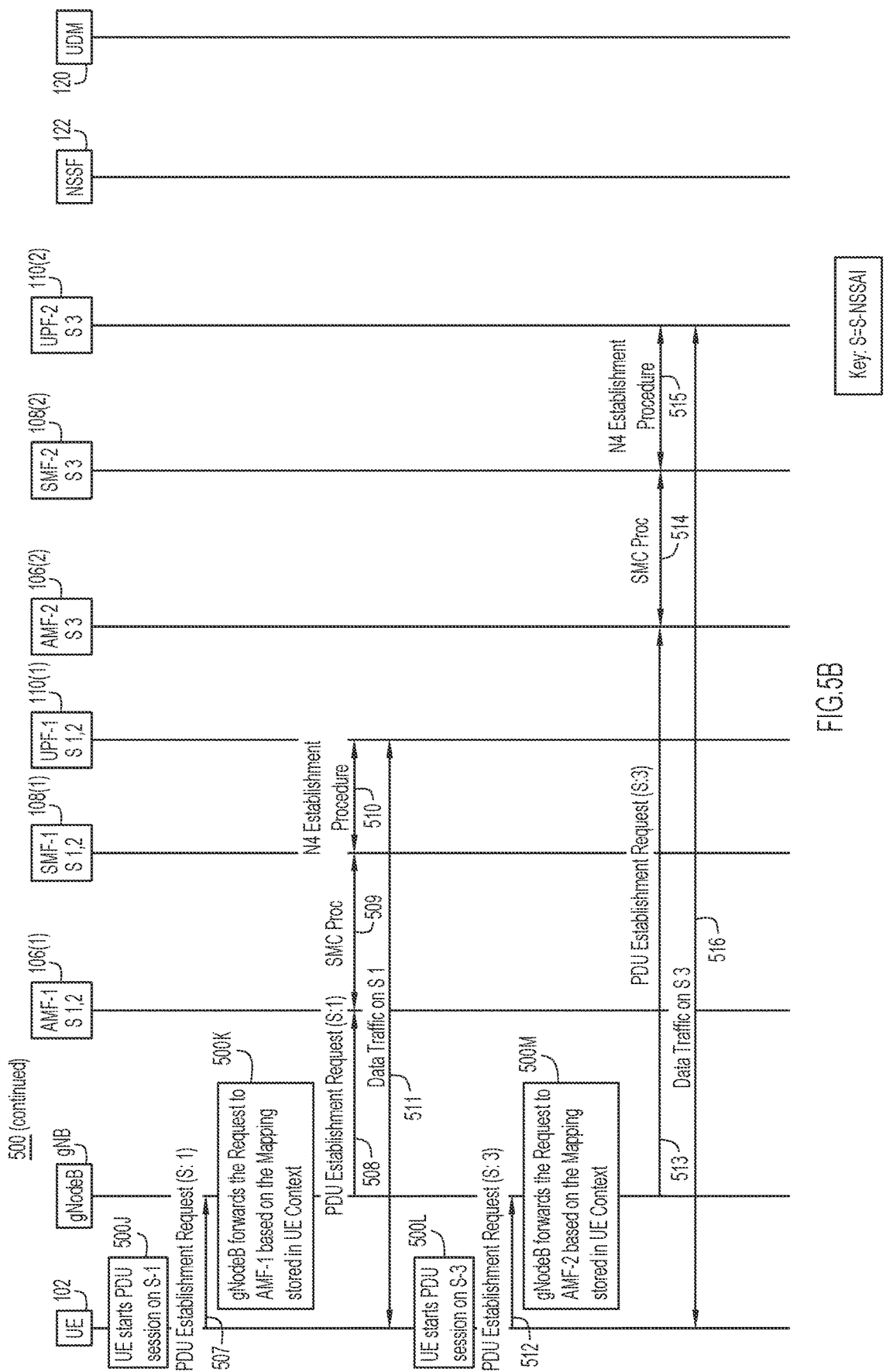

With reference to FIGS. 5A and 5B, there is an example call flow 500 for registration and PDU session establishment for UE 102 using single gNB and dual N2 interfaces connectivity. For brevity, the abbreviation "S" represents "S-NSSAI" and in the ensuing description, the term "slice" may be used in place of "S-NSSAI." Call flow 500 shows operations and signaling (generally referred to as "operations" or "transactions") for UE 102, a gNodeB (designated gNB) of access network 104 (denoted "RAN 104"), an AMF 106(1) (AMF-1), SMF 108(1) (SMF-1), UPF 110(1) (UPF-1), AMF 106(2) (AMF-2), SMF 108(2) (SMF-2), UPF 110(2) (UPF-2), NSSF 122, and UDM 120. Network functions designated by the suffix "-1" are each configured to support slices 1 and 2, only, while those designated by the suffix "-2" are each configured to support slice 3, only. UE 102 subscribes to a first service on/associated with slice 1 and a second service on/associated with slice 3.

Beginning with FIG. 5A, at initial/configuration operations 500A, 500B, 500C, 500D, and 500E, respectively, UE 102 is subscribed to services on slices 1 and 3, AMF-1 is configured to support slices 1 and 2, AMF-2 is configured to support slice 3, NSSF 122 is configured with mappings of AMF-1 to slices 1, 2 and AMF-2 to slice 3, and UDM 120 is configured with UE subscriptions to slices 1 and 3.

UE registration through AMF-1 is described first. At 501, UE 102 sends, to AMF-1 (via the gNB), a registration request asserting slices 1 and 3. The registration request includes identifiers of the UE. Upon receiving the registration request, at 502, AMF-1 executes UE authentication procedures with UDM 120 to authenticate UE 102 based on the information in the registration request.

Upon determining that AMF-1 does not support slice 3, at 500F, AMF-1 initiates and executes an SM-AMF/SO-AMF selection procedure with NSSF 122 to select, for UE 102, an SM-AMF and an SO-AMF that can provide the UE with support on both slices 1 and 3, concurrently. The SM-AMF/SO-AMF selection procedure includes, in part, next transactions 503 and 504. Transactions 503 and 504 rely on an NSSF Network Slice Selection function (NNSSF or Nnssf) and its associated signaling primitives for retrieval of AMF and slice information.

At 503, AMF-1 sends to NSSF 122 an NnSSF_NSSelection_Get_Request (referred to simply as a "Get Request") for SM-AMF/SO-AMF selections that support slices 1 and 3 for UE 102. The slices are indicated in the Get Request. Upon receiving the Get Request, NSSF 122 selects an SM-AMF and an SO-AMF from a list of available AMFs that are mapped to slices 1 and 3 at the NSSF. At 504, NSSF 122 sends to AMF-1 (and AMF-1 receives) an NnSSF_NS-Selection_Get_Response (referred to simply as a "Get Response") that indicates AMF-1 is selected as the SM-AMF to support slice 1 for UE 102, and AMF-2 is selected as the SO-AMF to support slice 3 for the UE. The SM-AMF/SO-AMF selection is specific to UE 102.

At 505, AMF-1 notifies the gNB over the N2 interface that AMF-1, AMF-2 are selected as SM-AMF, SO-AMF for slices 1, 3 for UE 102, respectively. This information provides UE context to the gNB. At 506, the gNB notifies AMF-2 that AMF-1, AMF-2 are selected as SM-AMF, SO-AMF for slices 1, 3 for UE 102, respectively.

At 500G the gNB stores, in a UE context for UE 102, mappings of (i) slices 1 and 3 to AMFs AMF-1 and AMF-2 that support the slices, respectively, and (ii) AMF-1 as SM-AMF and AMF-2 as SO-AMF. At 500H, AMF-1 records its designation as SM-AMF for UE 102. At 500I, AMF-2 records its designation as SO-AMF for UE 102.

Turning to FIG. 5B, PDU session establishment is now described. At 500J and 507, UE 102 starts a first PDU session to access a first service supported by slice 1. To do this, UE 102 sends to the gNB a first PDU session establishment request indicating slice 1. At 500K and 508, the gNB forwards the first PDU session establishment request to AMF-1 based on the mapping stored in its UE context. At 509, upon receiving the request, AMF-1 and SMF-1 interact with each other through a security mode command (SMC) procedure (which is considered a session management procedure that involves session management related signaling), which triggers an N4 establishment procedure between SMF-1 and UPF-1, at 510. This establishes the first PDU session on slice 1. At 511, traffic for the first service associated with slice 1 is forwarded between UE 102 and UPF-1.

At 500L and 512, UE 102 starts a second PDU session to access a second service supported by slice 3 by sending a second PDU session establishment request (which indicates slice 3) to the gNB. The UE-specific SM-AMF and SO-AMF combination supports establishment of the second PDU session while the first PDU session is already established and ongoing. At 500M and 513, the gNB forwards the request to AMF-2 based on the mapping stored in its UE context. Because AMF-2 is the SO-AMF for UE 102 with respect to slice 3, AMF-2 performs only session management for UE 102 with respect to slice 3. At 514, AMF-2 and SMF-2 engage in an SMC procedure (which involves session management related signaling), which triggers an N4 establishment procedure between SMF-2 and UPF-2, at 515. This establishes the second PDU session on slice 3. At 516, traffic for the second service associated with slice 3 is forwarded between UE 102 and UPF-2.

In the above call flow, SM-AMF (AMF-1) and SO-AMF (AMF-2) concurrently serve UE 102 on different slices 1 and 3, which provides UE 102 with access to the first and second services, concurrently. In this example, the SM-AMF provides mobility management of the UE and session management related signaling for the UE on slice 1 (e.g., the SMC procedure with SMF-1), while the SO-AMF provides session management related signaling for the UE on slice 3 (e.g., the SMC procedure with SMF-2).

Single gNB and Single N2 Interface Call Flows

Figure 6:
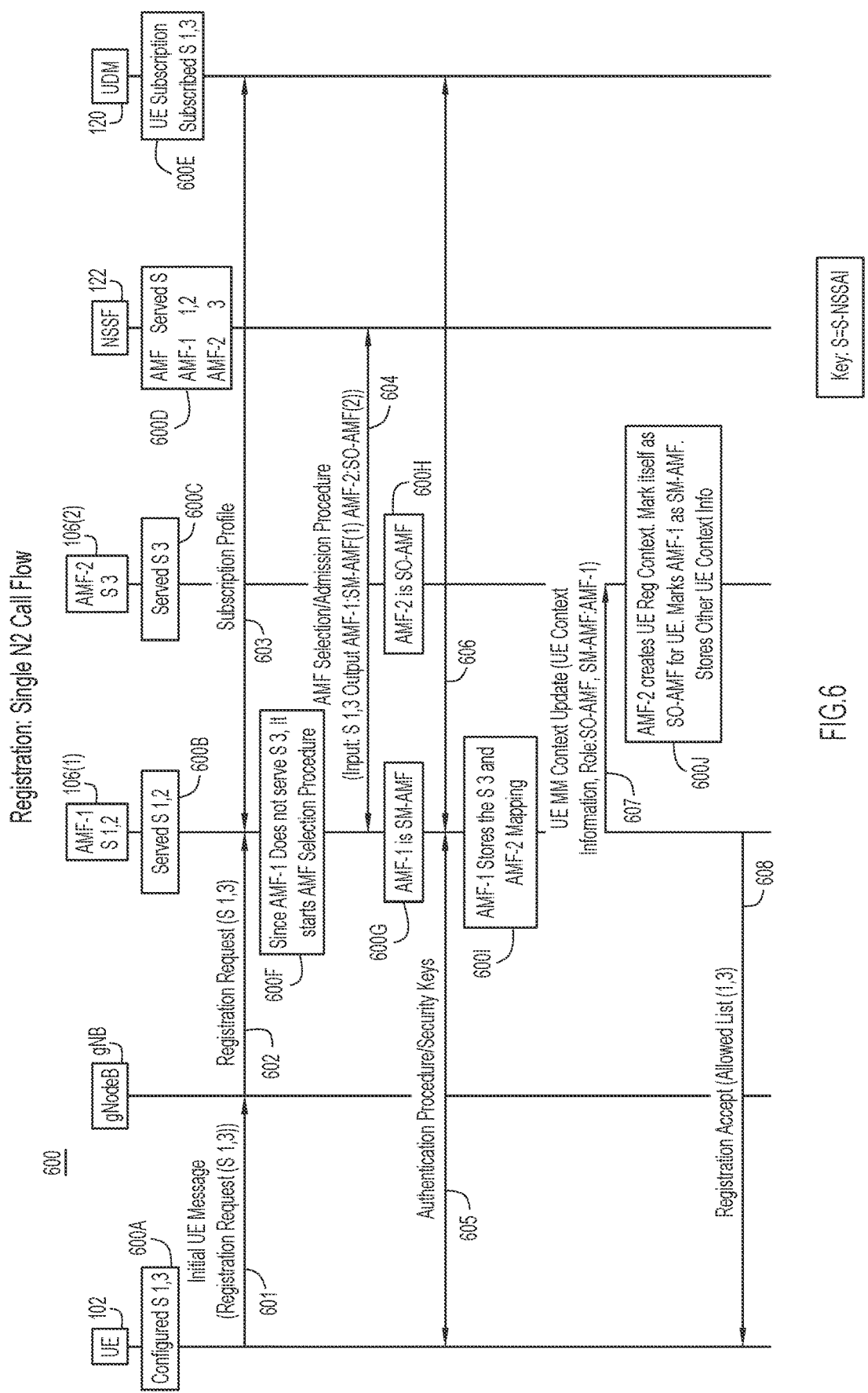
FIG. 6 is a call flow for registration of a UE using single gNB and single N2 interface connectivity, according to an example embodiment.

With reference to FIG. 6, there is an example call flow 600 for registration of UE 102 using single gNB and single N2 interface connectivity.

Initial/configuration operations 600A, 600B, 600C, 600D and 600E are similar to corresponding operations 500A-500E, and therefore will not be described further.

At 601, UE 102 sends, to the gNB, a registration request for slices 1 and 3 and that provides UE identifiers. At 602, the gNB forwards the registration request to AMF-1. Upon receiving the registration request, at 603, AMF-1 executes UE authentication procedures with UDM 120 to authenticate UE 102 based on the information in the registration request.

Upon determining that AMF-1 does not support slice 3, at 600F and 604, AMF-1 initiates and executes an SM-AMF/SO-AMF selection procedure with NSSF 122. AMF-1 is selected as SM-AMF for UE 102 on slice 1, and AMF-2 is selected as SO-AMF for the UE on slice 3. AMF-2, as SM-AMF, performs an SO-AMF admission procedure with AMF-2 to admit AMF-2 as SM-AMF. Thus, at 600G and 600H, AMF-1 and AMF-2 record their respective SM-AMF and SO-AMF roles or designations for UE 102.

At 605 and 606, AMF-1 performs an authentication procedure for UE 102 using UDM 120.

At 600I, AMF-1 stores a mapping of slice 3 to AMF-2. At 607, AMF-1 notifies AMF-2 of their respective SM-AMF and SO-AMF roles for UE 102 on the respective slices, i.e., provides a UE context to AMF-2. At 600I, AMF-2 stores, in a UE context for UE 102, mappings of AMF-1 to SM-AMF and AMF-2 to SO-AMF with their corresponding supported slices.

At 608, AMF-1 sends a registration accept to UE 102 indicating slices 1 and 3 are allowed/supported.

Figure 7A:
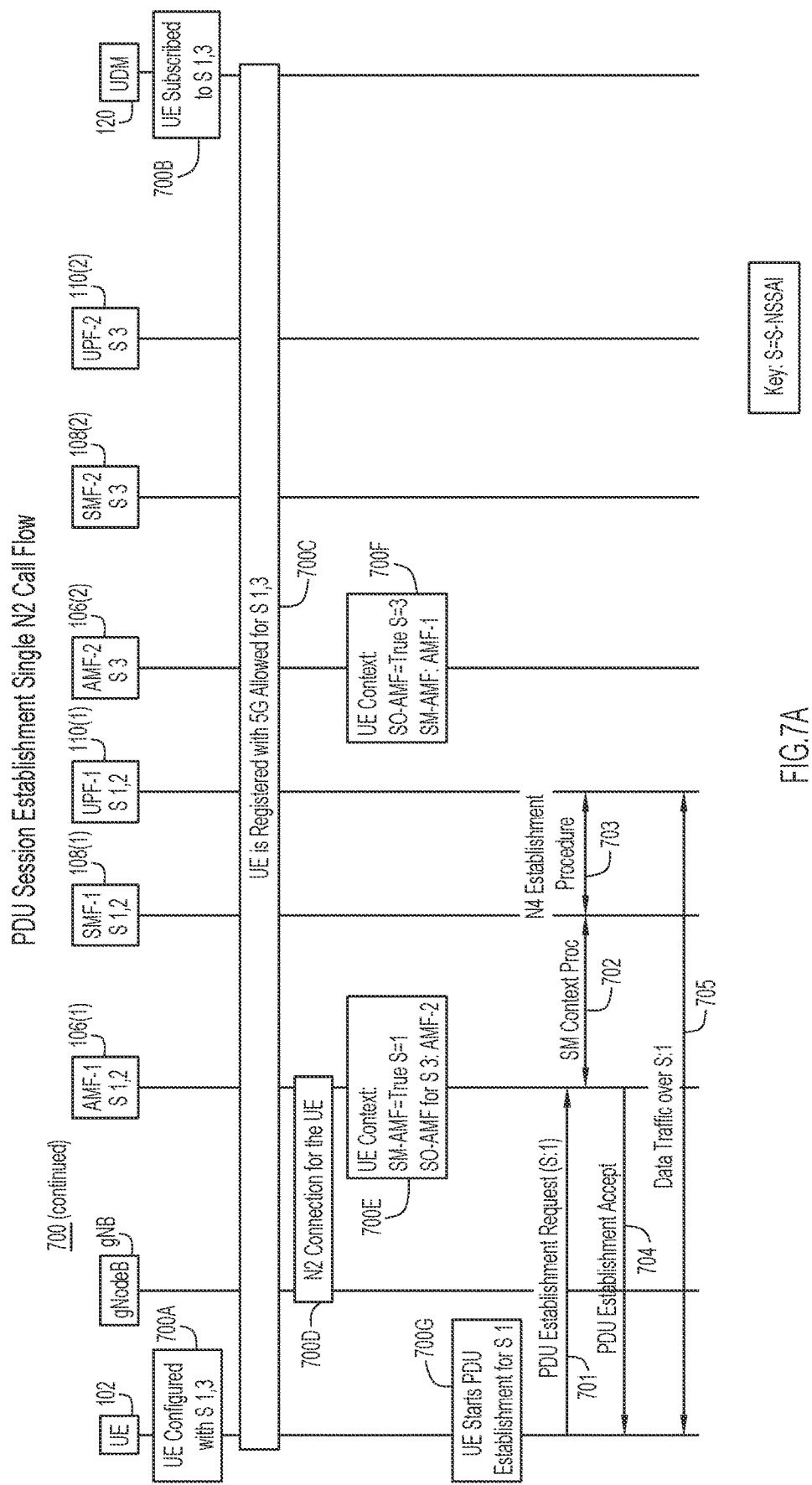
FIGS. 7A and 7B show a call flow for PDU session establishment for a UE using single gNB and single N2 interface connectivity, according to an example embodiment.
Figure 7B:
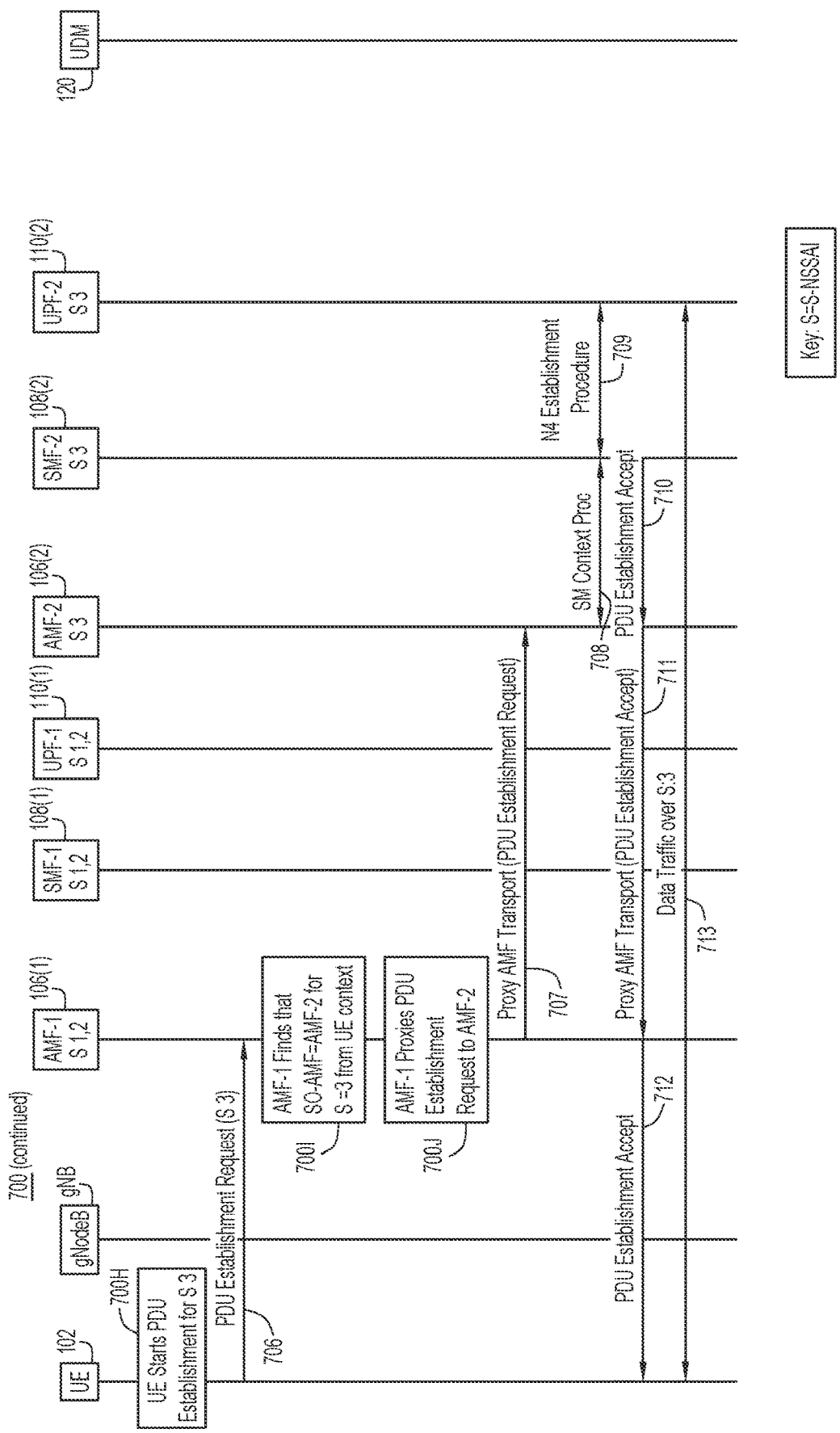

With reference to FIGS. 7A and 7B, there is an example call flow 700 for PDU session establishment for UE 102 using single gNB and single N2 interface connectivity.

Beginning with FIG. 7A, configuration operations 700A, 700B correspond to operations 600A, 600E described above.

At 700C, UE 102 is registered using call flow 600. The gNB has a single N2 interface to AMF-1, as indicated at 700D. At 700E, AMF-1 stores a UE context for UE 102 that maps AMF-1 to SM-AMF and slice 1, and AMF-2 to SO-AMF and slice 3. At 700F, AMF-2 stores the same UE context for UE 102.

At 700G and 701, UE 102 sends a first PDU establishment request for slice 1 to AMF-1 through the gNB. This triggers an SMC procedure with SMF-1 (including session management signaling) at 702 and an N4 establishment procedure with UPF-1 at 703, to establish a first PDU session for slice 1. At 704, AMF-1 sends a PDU establishment accept to UE 102. At 705, traffic for the first PDU session on slice 1 is exchanged with UPF-1.

Turning to FIG. 7B, concurrent with the first PDU session, at 700H and 706, UE 102 sends a second PDU establishment request for slice 3 to AMF-1 through the gNB. Upon determining that AMF-1 does not support slice 3 and that the SO-AMF is AMF-2 for slice 3 based on UE context stored at AMF-1 (700I), AMF-1 proxies (i.e., forwards) the second PDU session establishment request to AMF-2 (700J and 707), which receives the forwarded request.

Upon receiving the second PDU establishment request, AMF-2 (operating as SO-AMF for UE 102 on slice 3) triggers an SMC procedure (which includes session management signaling) with SMF-2 at 708 and an N4 establishment procedure with UPF-2 at 709, to establish a second PDU session for slice 3. At 710, SMF-2 sends to AMF-2 a PDU establishment accept for the second PDU session. In turn, at 711, AMF-2 proxies the PDU establishment accept to AMF-1, which, acting as proxy for AMF-2 on slice 3, forwards the accept to UE 102 at 712. At 713, traffic for the second PDU session on slice 3 is exchanged with UPF-2.

In summary, depending upon operator policy or number of (UE requested) slices supported, one of AMFs AMF-1 and AMF-2 may be designated as an SM-AMF. The SM-AMF processes all mobility management messages, and the session management messages for the slices service by it. In addition, the SM-AMF updates the SO-AMF with the UE context updates, security keys, etc., proxies all NAS messages coming from the UE to the SO-AMF and all NAS messages coming from the SO-AMF toward the UE, and performs UE paging on behalf of the SO-AMF. The gNB sends all NAS messages to the SM-AMF, and the SM-AMF sends the session management messages to the respective SO-AMF based on the slices served by the SO-AMF. The SO-AMF does not communicate with the gNB, rather, the SO-AMF routes all UE related communication via the SM-AMF. The SO-AMF performs all session management signaling functions and slice authentication specific to the slices that it serves.

High-Level Call Flow

With reference to FIG. 8, there is shown an illustration of a high-level call flow 800 based on the transactions described above in connection with FIGS. 5A-7B. At 801 and 802, UE 102 registers with AMF-1 for slices 1 and 3, and is authenticated. AMF-1 performs the SM-AMF/SO-AMF selection procedure (with NSSF 122) that selects/designates AMF-1 as SM-AMF for UE 102 on slice 1, and AMF-2 as SO-AMF for UE 102 on slice 3. At 803, 804, 805 and 806, a first PDU session for service on slice 1 is established for UE 102. While the first PDU session is ongoing, at 807, 808, 809, 810 and 811, a second PDU session for service on slice 3 is established for UE 102. The SM-AMF and SO-AMF concurrently serve UE 102, to provide UE 102 with access to services on slices 1 and 3 concurrently.

SM-AMF/SO-AMF Selection Call Flow

Figure 9A:
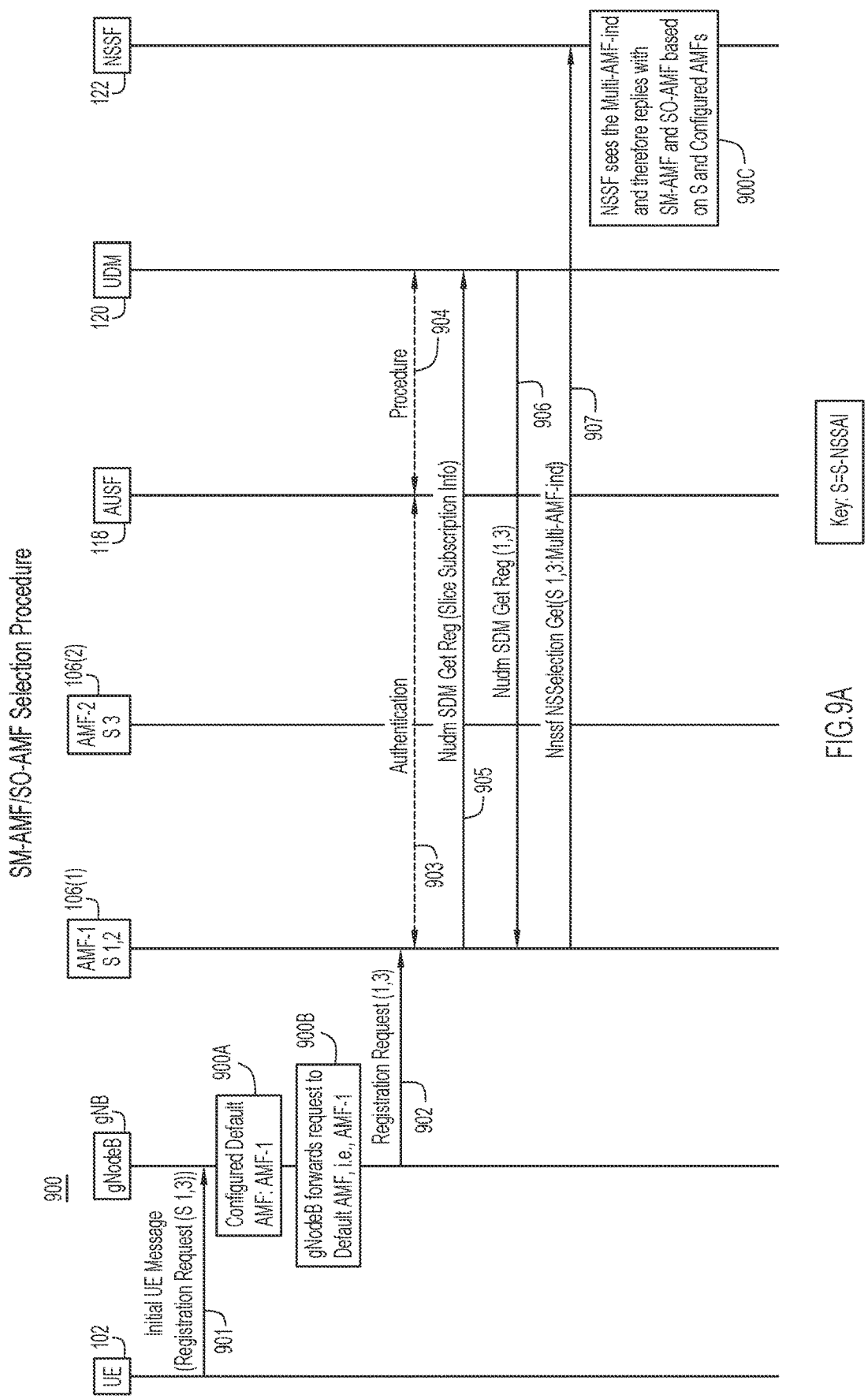

With reference to FIGS. 9A and 9B, there is an example call flow 900 for triggering and performing an SM-AMF/SO-AMF selection procedure. Some of the transactions shown in FIGS. 9A and 9B overlap with transactions previously described.

Beginning with FIG. 9A, at 901, UE 102 sends to the gNB a registration request asserting slices 1 and 3. The gNB is configured with AMF-1 as the default AMF (900A) and thus forwards the registration request to AMF-1 (900B and 902). At 903 and 904, AMF-1 authenticates UE 102 using AUSF 118 and UDM 120.

At 905 and 906, AMF-1 exchanges messages for software defined monitoring (SDM) over an N8 (N) UDM (Nudm) interface. Specifically, at 905, AMF-1 sends to UDM 120 an Nudm_SDM_Get_Request (Slice_Subscription_Info) to solicit slice subscription information for UE 102 from the UDM. In response, at 906, UDM 120 sends to AMF-1 an Nudm_SDM_Get_Response that indicates slices 1 and 3.

Upon determining that AMF-1 supports only slice 1, at 907, AMF-1 sends to NSSF 122 an NnSSF_NSSelection_Get_Request (referred to simply as a "Get Request") for SM-AMF/SO-AMF selections that support slices 1 and 3 for UE 102 (as was previously described in connection with FIG. 5A). Upon receiving the Get Request, at 900C, NSSF 122 determines/selects AMF-1 as SM-AMF for slice 1 and AMF-2 as SO-AMF for slice 3 for UE 102, based on a list of AMFs and the slices they support stored in the NSSF. Turning to FIG. 9B, at 908, NSSF 122 sends to AMF-1 (and AMF-1 receives) an NnSSF_NSSelection_Get_Response (referred to simply as a "Get Response") that indicates AMF-1 is selected as the SM-AMF to support slice 1 for UE 102, and AMF-2 is selected as the SO-AMF to support slice 3 for the UE. At 900D, NSSF 122 may also provide to AMF-1 multiple (e.g., a list of) SO-AMF candidates from which the SM-AMF may be selected by AMF-1. The SM-AMF/SO-AMF selection is specific to UE 102.

Responsive to the Get Response, at 900E, AMF-1 assumes the role of SM-AMF. Next, AMF-1 performs an SO-AMF admission procedure with AMF-2 to admit AMF-2 as the SM-AMF. This includes sending to AMF-2 an SO-AMF admission request indicating the role of AMF-2 as SO-AMF for UE 102 on slice 3 (909), and receiving from AMF-2 an SO-AMF admission response indicating success (910), i.e., acceptance of the SO-AMF role by AMF-2. On the other hand, when AMF-2 rejects the SO-AMF role (900F) (i.e., rejects being the SO-AMF), AMF-1 selects another AMF for the SO-AMF role with assistance from NSSF 122, e.g., the NSSF may provide AMF-1 with a list of alternative AMFs for the SO-AMF, and AMF-1 can select another AMF for the SO-AMF from the list. At 911 and 912, AMF-2 sends to AMF-1 a UE context request, and AMF-1 responds to AMF-2 with a UE context response that maps AMF-2 to the SO-AMF role on slice 3 for UE 102. Responsive to the UE 102 context response, AMF-2 assumes the role of SO-AMF (900G).

Dual Connectivity Call Flow

Figure 10A:
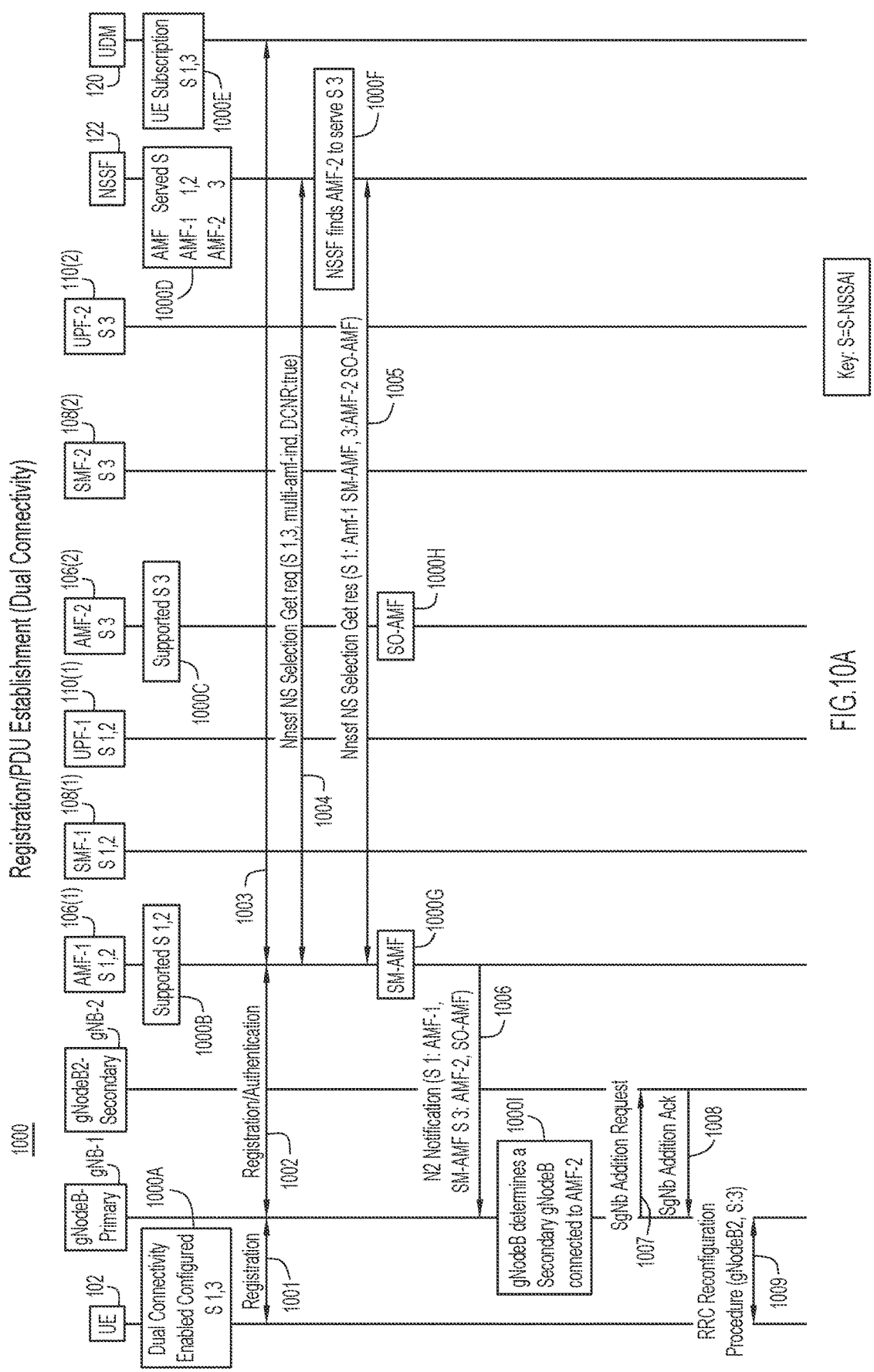
FIGS. 10A and 10B show a call flow for registration and PDU session establishment for a UE using dual gNB connectivity, according to an example embodiment.
Figure 10B:
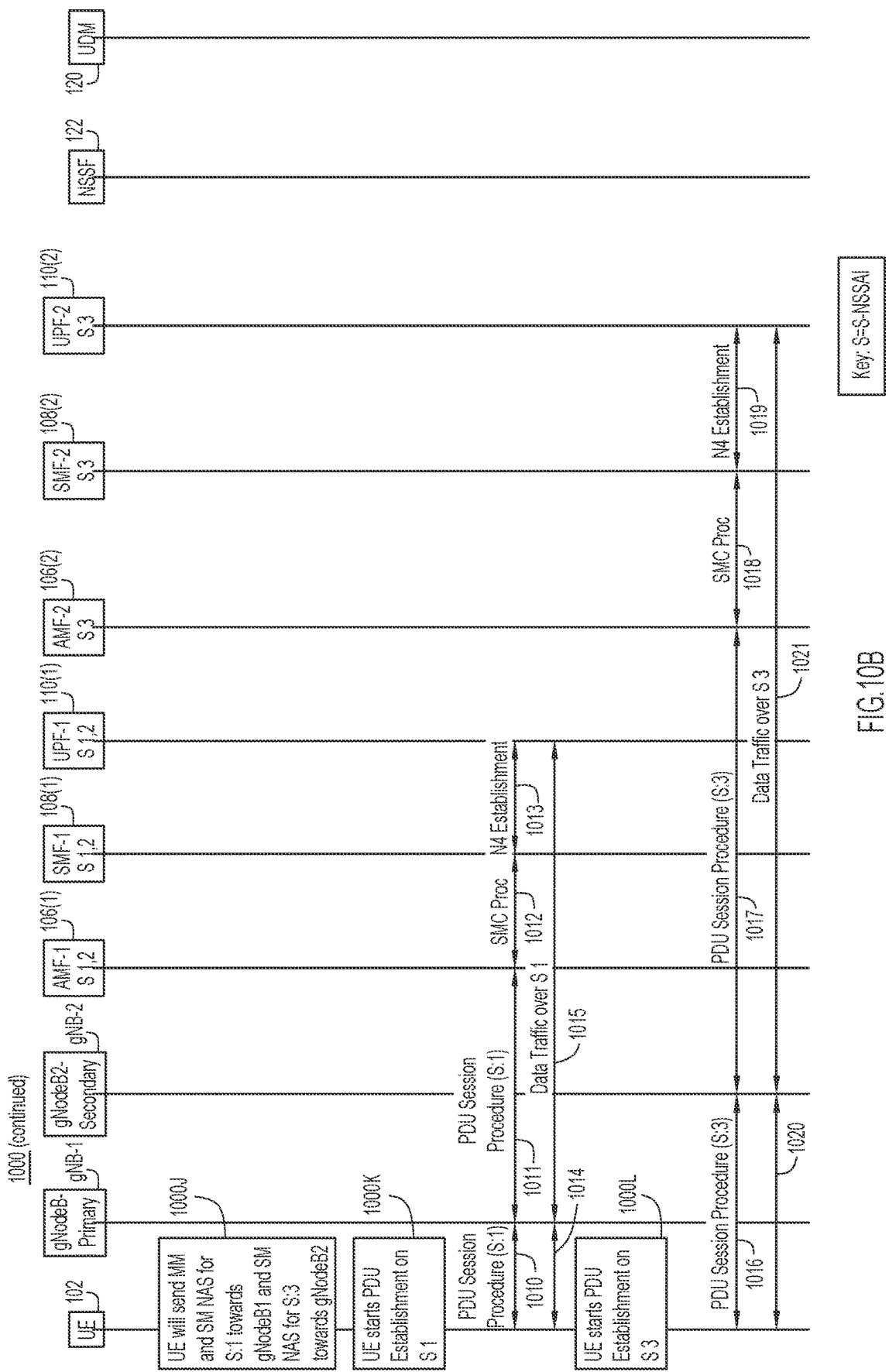

With reference to FIGS. 10A and 10B, there is an example call flow 1000 for registration and PDU session establishment for UE 102 using dual connectivity (i.e., two gNBs including gNB-1 and gNB-2 with which the UE may connect).

Beginning with FIG. 10A, operations 1000A, 1000B, 1000C, 1000D, 1000E and 1000F and 1001, 1002, 1003, 1004 and 1005 are generally similar to corresponding operations 500A-500F and 501 and 502 of call flow 500 in FIG. 5A, except for the following: (i) the Get Request sent by AMF-2 to NSSF 122 at 1004 is a multi-AMF request that indicates dual-connectivity with new radio (DCNR), (ii) at 1000F, the NSSF finds AMF-2 to serve slice 3, and (iii) the Get Response sent by the NSSF to AMF-1 at 1005 indicates AMF-1 as an SM-AMF. Based on the foregoing, AMF-1 becomes the SM-AMF (1000G) and AMF-2 becomes an SO-AMF (1000H).

At 1006, AMF-1 notifies gNB-1 that AMF-1 is an SM-AMF for UE 102 on slice 1, and AMF-2 is an SO-AMF for UE 102 on slice 3. In response, at 10001, gNB determines a secondary gNB (i.e., gNB-2) connected to AMF-2. At 1007, gNB-1 sends a secondary gNB (SgNB) addition request to gNB-2. At 1008, gNB-2 sends an SgNB addition acknowledge to gNB-1 in response to the request. Next, at 1009, gNB-1 performs a radio resource control (RRC) Reconfiguration procedure with UE 102 to inform/configure UE 102 to connect to gNB-2 for access to slice 3.

Turning to FIG. 10B, based on the RRC Reconfiguration procedure, at 1000J, UE 102 is configured to send mobility management (MM) and session management (SM) NAS signaling/messages for slice 1 toward gNB-1, and SM NAS signaling/messages toward gNB-2.

At 1000K, UE 102 starts a first PDU session on slice 1, through gNB-1. This includes a PDU session procedure between UE 102 and gNB-1 (1010), which triggers a PDU session procedure between gNB-1 and AMF-1 (1011), an SMC procedure between AMF-1 and SMF-1 (1012), and an N4 establishment procedure between SMF-1 and UPF-1 (1013). At 1014 and 1015, data traffic for slice 1 is then exchanged between UE 102 and UPF-1 during the first PDU session.

While the first PDU session is ongoing, at 1000L, UE 102 starts a second PDU session on slice 3, through gNB-2. This includes a PDU session procedure between UE 102 and gNB-2 (1016), which triggers a PDU session procedure between gNB-2 and AMF-2 (1017), an SMC procedure between AMF-2 and SMF-2 (1018), and an N4 establishment procedure between SMF-2 and UPF-2 (1019). At 1020 and 1021, data traffic on slice 3 is then exchanged between UE 102 and UPF-2 during the second PDU session.

Flowcharts

Figure 11:
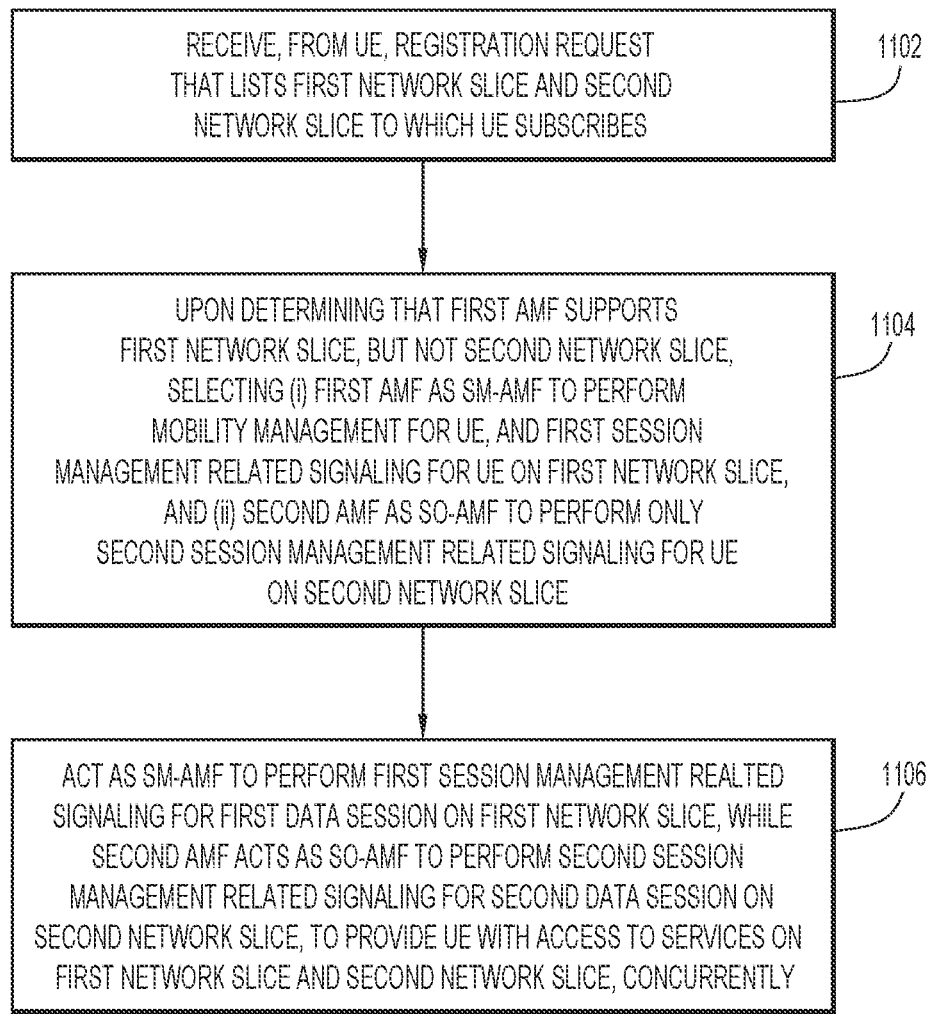
FIG. 11 is a flowchart of a method by which an SM-AMF and an SO-AMF concurrently serve a UE on different network slices, according to an example embodiment.

With reference to FIG. 11, there is a flowchart of an example method 1100 by which two AMFs (e.g., AMF-1 and AMF-2), configured to support different network slices in a network (e.g., 5G network 100), concurrently serve UE (e.g., UE 102, such as a mobile device) to provide the UE with access to services on the network slices, concurrently. Method 1100 incorporates various operations described above.

At 1102, a first AMF receives, from the UE, a registration request that lists a first network slice and a second network slice. At 1104, upon determining that the first AMF supports the first network slice, but not the second network slice, the first AMF initiates an SM-AMF/SO-AMF selection procedure to select (i.e., causes the selection/designation of) (i) the first AMF as an SM-AMF to perform mobility management for the UE, and to perform first session management related signaling with a first SMF/UPF for the UE on the first network slice (e.g., to support session management with respect to data session establishment for the first network slice); and (ii) a second AMF as an SO-AMF to perform only second session management related signaling with a second SMF/UPF for the UE on the second network slice (e.g., to support session management with respect to data session establishment for the second network slice).

Based on the SM-AMF/SO-AMF selection, AMF-1 is configured to operate as the SM-AMF and AMF-2 is configured to operate as the SO-AMF. At 1106, the first AMF, acting as the SM-AMF, performs the first session management related signaling with the first SMF for a first data session (e.g., a first PDU session) on the first network slice, while the second AMF, acting as the SO-AMF, only performs the second session management related signaling with the second SMF for a second data session (e.g., a second PDU session) on the second network slice, to provide the UE with access to services on the first network slice and the second network slice, concurrently. Thus, the first AMF and the second AMF concurrently serve the UE to provide the UE with access to services on the first network slice and the second network slice, concurrently.

In an example, the first AMF may perform the first session management signaling by performing, in part, a first security mode command (SMC) procedure with the first SMF to establish the first data session. Similarly, the second AMF may perform the second session management signaling, in part, by performing a second SMC procedure with the second SMF to establish the second data session. In addition, when the first AMF receives, from the UE, a first request (e.g., a PDU establishment request) to establish the first data session on the first network slice, the first AMF facilitates establishment of the first data session. Similarly, when the second AMF receives, from the UE, a second request to establish the second data session on the second network slice, the second AMF facilitates establishment of the second data session while the first AMF performs the mobility management of the UE. The first AMF, but not the second AMF, performs the mobility management for the UE concurrently with the second AMF performing the second session management, and the first AMF performing the first session management.

In addition, responsive to selection of the SM-AMF and the SO-AMF, the first AMF performs an SO-AMF admission procedure to notify the second AMF that the second AMF is selected as the SO-AMF for the UE on the second network slice. The SO-AMF admission procedure includes, by the first AMF: sending an SO-AMF admission request to the second AMF; and receiving a first SO-AMF admission response from the second AMF that indicates the second AMF accepts being the SO-AMF. If the first AMF receives a second SO-AMF admission response (instead of the first SO-AMF response) from the second AMF that indicates that the second AMF rejects being the SO-AMF, the first AMF selects, from a list of alternative AMFs provided by an NSSF, a third AMF to be the SO-AMF.

In an embodiment in which the network includes a radio access node (e.g., a gNB) configured with a signaling interface to the first AMF, but not to the second AMF, the radio access node forwards all signaling messages originated by the UE and destined for either the first AMF (for the first network slice) or the second AMF (for the second network slice) to the first AMF over the signaling interface. The first AMF acts as a proxy for the second AMF by forwarding signaling messages for the second network slice (e.g., for the second session management of the second data session) to the second AMF based on a UE context stored at the first AMF that maps the network slices to their respective AMFs. Similarly, in the reverse direction, the second AMF forwards signaling messages destined for the UE to the first AMF, and the first AMF, acting as proxy for the second AMF, forwards those messages to the radio access node, to be forwarded to the UE.

Figure 12:
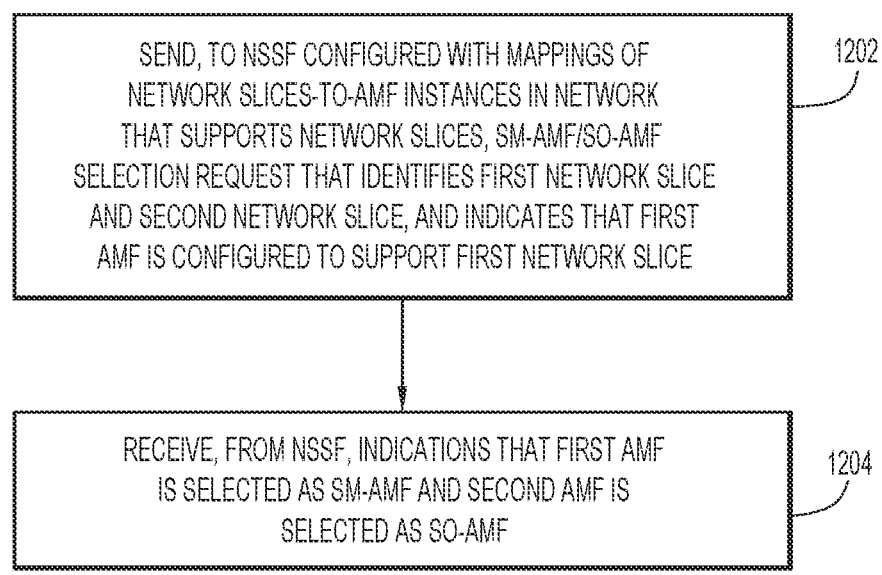
FIG. 12 is a flowchart of a method of performing SM-AMF/SO-AMF selection, according to an example embodiment.

With reference to FIG. 12, there is a flowchart of an example method 1200 of performing the SM-AMF/SO-AMF selection procedure. At 1202, the first AMF sends, to an NSSF configured with mappings of network slices-to-AMF instances in the network that support the network slices, an AMF selection request that identifies the first network slice and the second network slice, and indicates that the first AMF is configured to support the first network slice. At 1204, the first AMF receives, from the NSSF, indications that the first AMF is selected as the SM-AMF and the second AMF is selected as the SO-AMF.

Figure 13:
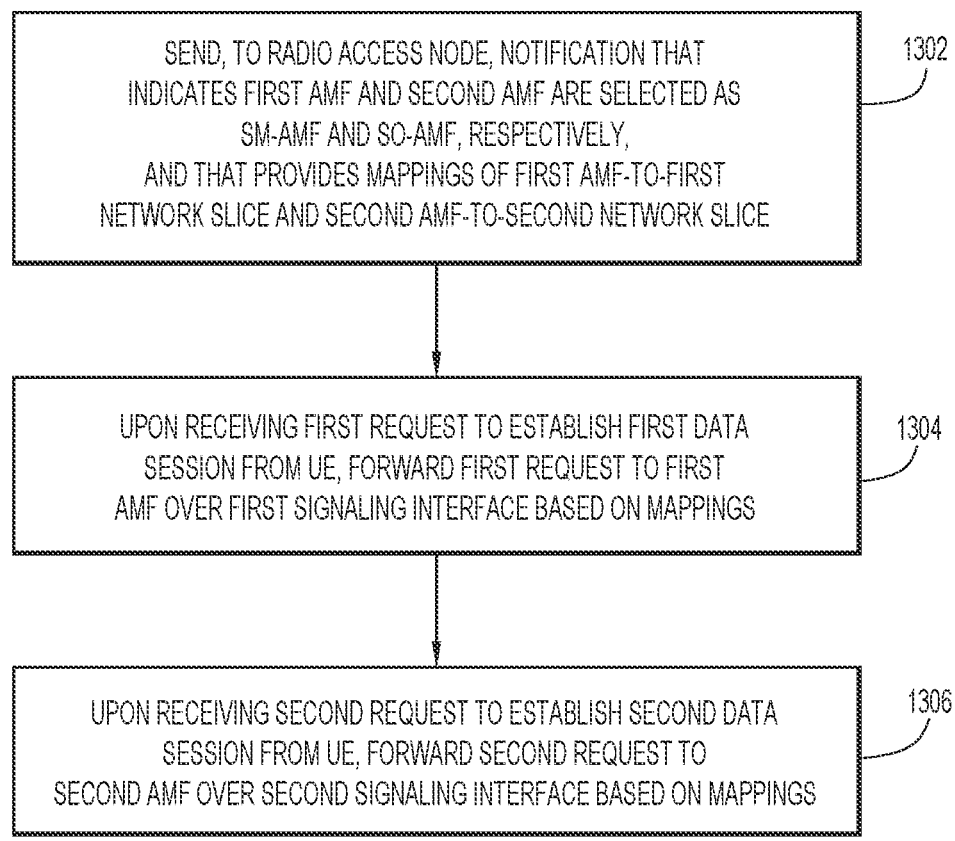
FIG. 13 is a flowchart of a method performed when the network includes single gNodeB (gNB) and dual N2 interfaces connectivity to the SM-AMF and the SO-AMF, according to an example embodiment.

With reference to FIG. 13, there is a flowchart of an example method 1300 performed when the network includes single gNB and dual N2 interfaces connectivity. More generally, the network includes a radio access node (e.g., gNB) to connect with the UE and that is configured with a first signaling interface to the first AMF and a second signaling interface to the second AMF. Method 1300 may be performed after the first AMF and the second AMF are selected as SM-AMF and SO-AMF in method 1100.

At 1302, the first AMF sends, to the radio access node, a notification that indicates the first AMF and the second AMF are selected as SM-AMF and SO-AMF for the UE, respectively, and that provides mappings of the first AMF-to-the first network slice and the second AMF-to-the second network slice. The radio access node stores the mappings in a UE context for the UE.

Upon receiving a first request to establish the first data session from the UE, at 1304, the first radio access node forwards the first request to the first AMF over the first signaling interface based on the mappings.

Upon receiving a second request to establish the second data session from the UE, at 1306, the radio access node forwards the second request to the second AMF over the second signaling interface based on the mappings.

Figure 14:
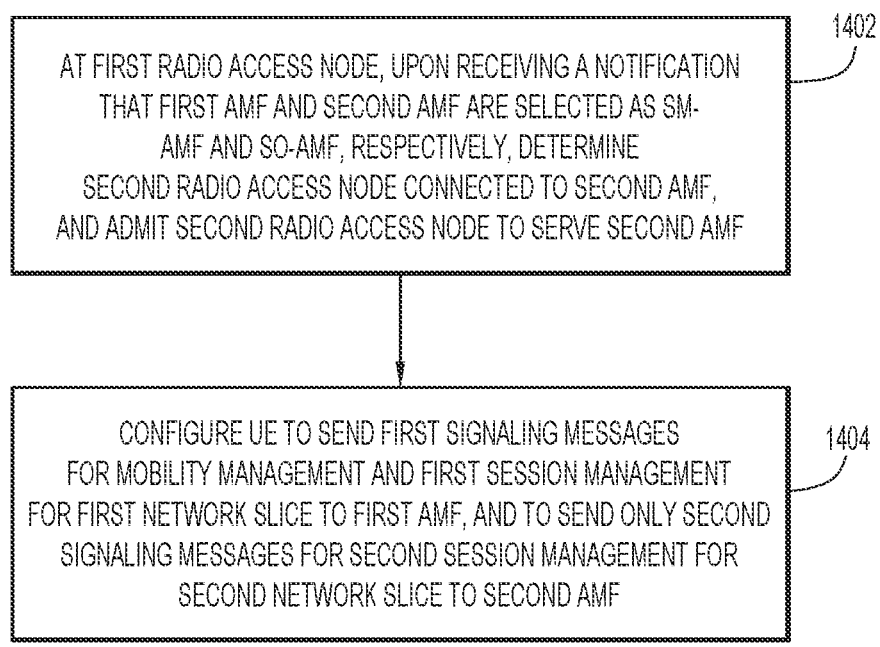
FIG. 14 is a flowchart of an example method performed when the network includes dual connectivity, according to an example embodiment.

With reference to FIG. 14, there is a flowchart of an example method 1400 performed when the network includes dual connectivity. That is, the network includes a first radio access node (e.g., gNB) and a second radio access node to connect with the UE and to connect with the first AMF and the second AMF, respectively. At 1402, the first radio access node receives, from the first AMF, a notification that the first AMF and the second AMF are selected as SM-AMF (e.g., primary AMF) and SO-AMF (e.g., secondary AMF), respectively. Upon receiving the notification, the first radio access node determines/discovers the second radio access node that is connected to the second AMF, and admits the second radio access node to serve the second AMF.

At 1404, the first radio access node configures the UE to send first signaling messages for the mobility management and the first session management for the first network slice to the first AMF acting as SM-AMF for the first network slice, and to send only send second signaling messages for the second session management for the second network slice to the second AMF acting as SO-AMF.

Computer System

Figure 15:
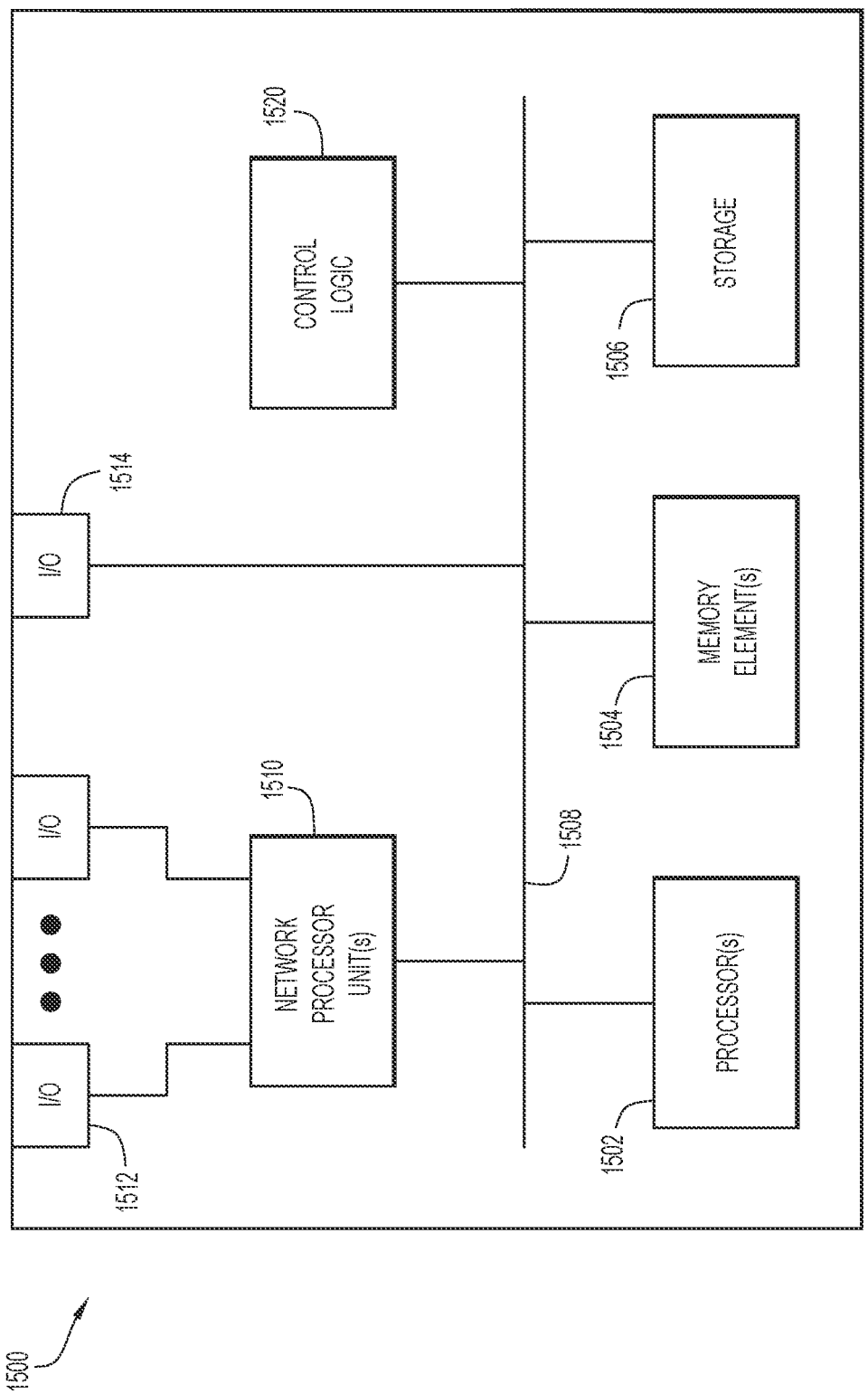
FIG. 15 is a hardware block diagram of a computing device that may perform operations described herein, according to an example embodiment.

Referring to FIG. 15, FIG. 15 illustrates a hardware block diagram of a computing device 1500 that may perform functions associated with operations discussed herein in connection with the techniques depicted in FIGS. 1-14. In various embodiments, a computing device or apparatus, such as computing device 1500 or any combination of computing devices 1500, may be configured as any entity/entities as discussed for the techniques depicted in connection with FIGS. 1-14 in order to perform operations of the various techniques discussed herein. Computing device 1500 may be configured to perform as any of an AMF, an SMF, an NSSF, a radio access node (e.g., eNB and gNB), UE, and so on, as described herein.

In at least one embodiment, the computing device 1500 may be any apparatus that may include one or more processor(s) 1502, one or more memory element(s) 1504, storage 1506, a bus 1508, one or more network processor unit(s) 1510 interconnected with one or more network input/output (I/O) interface(s) 1512, one or more I/O interface(s) 1514, and control logic 1520. In various embodiments, instructions associated with logic for computing device 1500 can overlap in any manner and are not limited to the specific allocation of instructions and/or operations described herein.

In at least one embodiment, processor(s) 1502 is/are at least one hardware processor configured to execute various tasks, operations and/or functions for computing device 1500 as described herein according to software and/or instructions configured for computing device 1500. Processor(s) 1502 (e.g., a hardware processor) can execute any type of instructions associated with data to achieve the operations detailed herein. In one example, processor(s) 1502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1504 and/or storage 1506 is/are configured to store data, information, software, and/or instructions associated with computing device 1500, and/or logic configured for memory element(s) 1504 and/or storage 1506. For example, any logic described herein (e.g., control logic 1520) can, in various embodiments, be stored for computing device 1500 using any combination of memory element(s) 1504 and/or storage 1506. Note that in some embodiments, storage 1506 can be consolidated with memory element(s) 1504 (or vice versa), or can overlap/exist in any other suitable manner.

In at least one embodiment, bus 1508 can be configured as an interface that enables one or more elements of computing device 1500 to communicate in order to exchange information and/or data. Bus 1508 can be implemented with any architecture designed for passing control, data and/or information between processors, memory elements/storage, peripheral devices, and/or any other hardware and/or software components that may be configured for computing device 1500. In at least one embodiment, bus 1508 may be implemented as a fast kernel-hosted interconnect, potentially using shared memory between processes (e.g., logic), which can enable efficient communication paths between the processes.

In various embodiments, network processor unit(s) 1510 may enable communication between computing device 1500 and other systems, entities, etc., via network I/O interface(s) 1512 (wired and/or wireless) to facilitate operations discussed for various embodiments described herein. In various embodiments, network processor unit(s) 1510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1500 and other systems, entities, etc. to facilitate operations for various embodiments described herein. In various embodiments, network I/O interface(s) 1512 can be configured as one or more Ethernet port(s), Fibre Channel ports, any other I/O port(s), and/or antenna(s)/antenna array(s) now known or hereafter developed. Thus, the network processor unit(s) 1510 and/or network I/O interface(s) 1512 may include suitable interfaces for receiving, transmitting, and/or otherwise communicating data and/or information in a network environment.

I/O interface(s) 1514 allow for input and output of data and/or information with other entities that may be connected to computer device 1500. For example, I/O interface(s) 1514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1520 can include instructions that, when executed, cause processor(s) 1502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1504 and/or storage 1506 can store data, software, code, instructions (e.g., processor instructions), logic, parameters, combinations thereof, and/or the like used for operations described herein. This includes memory element(s) 1504 and/or storage 1506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided comprising: at a first access and mobility management function (AMF) in a network, receiving, from user equipment, a registration request listing a first network slice and a second network slice; at the first AMF, upon determining that the first AMF supports the first network slice, but not the second network slice, selecting, for the user equipment, (i) the first AMF as a Session and Mobility Management-AMF to perform mobility management, and first session management signaling for the first network slice; and (ii) a second AMF as a Session Management Only-AMF to perform only second session management signaling for the second network slice; and at the first AMF, acting as the Session and Mobility Management-AMF, performing the first session management signaling with a first session management function for a first data session on the first network slice, while the second AMF, acting as the Session Management Only-AMF, is performing the second session management signaling with a second session management function for a second data session on the second network slice, to provide the user equipment with access to the first network slice and the second network slice, concurrently.

The network may include a radio access node configured with a first signaling interface to the first AMF and a second signaling interface to the second AMF, and the method may further comprise, at the first AMF: sending, to the radio access node, a notification that indicates the first AMF and the second AMF are selected as the Session and Mobility Management-AMF and the Session Management Only-AMF, respectively, and that provides mappings of the first AMF to the first network slice and the second AMF to the second network slice. The method may further comprise, at the radio access node: upon receiving a first request to establish the first data session from the user equipment, forwarding the first request to the first AMF over the first signaling interface based on the mappings; and upon receiving a second request to establish the second data session from the user equipment, forwarding the second request to the second AMF over the second signaling interface based on the mappings.

In another form, an apparatus is provided comprising: a network input/output interface to communicate with a network; and a processor of a first access and mobility management function (AMF), the processor coupled to the network input/output interface and configured to perform: receiving, from user equipment, a registration request listing a first network slice and a second network slice; upon determining that the first AMF supports the first network slice, but not the second network slice, selecting, for the user equipment, (i) the first AMF as a Session and Mobility Management-AMF to perform mobility management, and first session management signaling for the first network slice; and (ii) a second AMF as a Session Management Only-AMF to perform only second session management signaling for the second network slice; and acting as the Session and Mobility Management-AMF, performing the first session management signaling with a first session management function for a first data session on the first network slice, while the second AMF, acting as the Session Management Only-AMF, is performing the second session management signaling with a second session management function for a second data session on the second network slice, to provide the user equipment with access to the first network slice and the second network slice, concurrently.

In yet another form, non-transitory computer readable media is/are provided. The computer readable media stores or is encoded with instructions that, when executed by one or more processors, cause the one or more processors to perform: at a first access and mobility management function (AMF) in a network, receiving, from user equipment, a registration request listing a first network slice and a second network slice; at the first AMF, upon determining that the first AMF supports the first network slice, but not the second network slice, selecting, for the user equipment, (i) the first AMF as a Session and Mobility Management-AMF to perform mobility management, and first session management signaling for the first network slice; and (ii) a second AMF as a Session Management Only-AMF to perform only second session management signaling for the second network slice; and at the first AMF, acting as the Session and Mobility Management-AMF, performing the first session management signaling with a first session management function for a first data session on the first network slice, while the second AMF, acting as the Session Management Only-AMF, is performing the second session management signaling with a second session management function for a second data session on the second network slice, to provide the user equipment with access to the first network slice and the second network slice, concurrently.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a first access and mobility management function (AMF) (first AMF) in a network, receiving, from user equipment, a registration request listing a first network slice and a second network slice;
   at the first AMF, upon determining that the first AMF supports the first network slice, but not the second network slice, triggering an AMF selection procedure including:
      selecting, for the user equipment, (i) the first AMF as a Session and Mobility Management-AMF to operate in a full AMF role to perform registration, network slice authentication, securing context management, connection management, and mobility management, and first session management signaling for the first network slice and the user equipment, and (ii) a second AMF as a Session Management Only-AMF to operate in a limited AMF role to perform only second session management signaling for the second network slice; and
      notifying the first AMF and the second AMF respectively of designations as the Session and Mobility Management-AMF and the Session Management Only-AMF; and
   responsive to the designations, at the first AMF, acting as the Session and Mobility Management-AMF, performing the first session management signaling with a first session management function for a first data session on the first network slice, while the second AMF, acting as the Session Management Only-AMF, is performing the second session management signaling with a second session management function for a second data session on the second network slice, to provide the user equipment with access to the first network slice and the second network slice, concurrently.

2. The method of claim 1, further comprising:
   at the first AMF, but not the second AMF, performing the mobility management for the user equipment concurrently with the second AMF performing the second session management signaling.

3. The method of claim 1, wherein selecting includes:
   sending, to a network slice selection function (NSSF) configured with mappings of network slices to AMF instances in the network that support the network slices, a Session and Mobility Management-AMF/Session Management Only-AMF selection request that identifies the first network slice and the second network slice, and indicates that the first AMF is configured to support the first network slice; and
   receiving, from the NSSF, indications that the first AMF is selected as the Session and Mobility Management-AMF and the second AMF is selected as the Session Management Only-AMF.

4. The method of claim 1, further comprising, at the first AMF:
   performing a Session Management Only-AMF admission procedure to notify the second AMF that the second AMF is selected as the Session Management Only-AMF for the user equipment for the second network slice.

5. The method of claim 4, wherein the Session Management Only-AMF admission procedure includes:
sending a Session Management Only-AMF admission request to the second AMF; and
receiving a first Session Management Only-AMF admission response from the second AMF that indicates that the second AMF accepts being the Session Management Only-AMF.

6. The method of claim 5, wherein the Session Management Only-AMF admission procedure further includes:
upon receiving a second Session Management Only-AMF admission response from the second AMF that indicates that the second AMF rejects being the Session Management Only-AMF, selecting, from a list of alternative AMFs, a third AMF to be the Session Management Only-AMF.

7. The method of claim 1, wherein the network includes a radio access node configured with a first signaling interface to the first AMF and a second signaling interface to the second AMF, and the method further comprises, at the first AMF:
sending, to the radio access node, a notification that indicates the first AMF and the second AMF are selected as the Session and Mobility Management-AMF and the Session Management Only-AMF, respectively, and that provides mappings of the first AMF to the first network slice and the second AMF to the second network slice.

8. The method of claim 7, further comprising, at the radio access node:
forwarding signaling messages for the mobility management of the user equipment between the user equipment and the first AMF, but not between the user equipment and the second AMF.

9. The method of claim 1, wherein the network includes a radio access node configured with a signaling interface with the first AMF, but not the second AMF, and the method further comprises, at the first AMF:
acting as a proxy for the second AMF by forwarding messages of the second session management signaling for the second data session from the user equipment to the second AMF, and from the second AMF to the user equipment, through the radio access node.

10. The method of claim 1, further comprising:
at a first radio access node connected to the first AMF, upon receiving a notification that the first AMF and the second AMF are selected as the Session and Mobility Management-AMF and the Session Management Only-AMF, respectively, determining a second radio access node connected to the second AMF, and admitting the second radio access node to serve the second AMF.

11. The method of claim 10, further comprising:
at the first radio access node, configuring the user equipment to send first signaling messages for the mobility management and the first session management signaling for the first network slice to the first AMF, and to send only send second signaling messages for the second session management signaling for the second network slice to the second AMF.

12. The method of claim 1, wherein:
the first AMF and the second AMF are each configured to selectively operate as either the Session and Mobility Management-AMF or the Session Management Only-AMF for the user equipment.

13. The method of claim 1, further comprising:
at the first AMF, upon receiving, from the user equipment, a first request to establish the first data session on the first network slice, facilitating first establishment of the first data session; and
at the second AMF, upon receiving, from the user equipment, a second request to establish the second data session on the second network slice, facilitating second establishment of the second data session while the first AMF is performing the mobility management of the user equipment.

14. The method of claim 1, wherein the network includes a 5G network.

15. An apparatus comprising:
a network input/output interface to communicate with a network; and
a processor of a first access and mobility management function (AMF) (first AMF), the processor coupled to the network input/output interface and configured to perform:
receiving, from user equipment, a registration request listing a first network slice and a second network slice;
upon determining that the first AMF supports the first network slice, but not the second network slice, triggering an AMF selection procedure including:
selecting, for the user equipment, (i) the first AMF as a Session and Mobility Management-AMF to operate in a full AMF role to perform registration, network slice authentication, securing context management, connection management, and mobility management, and first session management signaling for the first network slice and the user equipment, and (ii) a second AMF as a Session Management Only-AMF to operate in a limited AMF role to perform only second session management signaling for the second network slice; and
notifying the first AMF and the second AMF respectively of designations as the Session and Mobility Management-AMF and the Session Management Only-AMF; and
responsive to the designations, acting as the Session and Mobility Management-AMF, performing the first session management signaling with a first session management function for a first data session on the first network slice, while the second AMF, acting as the Session Management Only-AMF, is performing the second session management signaling with a second session management function for a second data session on the second network slice, to provide the user equipment with access to the first network slice and the second network slice, concurrently.

16. The apparatus of claim 15, wherein the processor is configured to perform selecting by:
sending, to a network slice selection function (NSSF) configured with mappings of network slices to AMF instances in the network that support the network slices, a Session and Mobility Management-AMF/Session Management Only-AMF selection request that identifies the first network slice and the second network slice, and indicates that the first AMF is configured to support the first network slice; and
receiving, from the NSSF, indications that the first AMF is selected as the Session and Mobility Management-AMF and the second AMF is selected as the Session Management Only-AMF.

17. The apparatus of claim 15, wherein the processor is further configured to perform a Session Management Only-AMF admission procedure to notify the second AMF that the second AMF is selected as the Session Management Only-AMF for the user equipment for the second network slice.

18. Non-transitory computer readable media encoded with instructions that, when executed by one or more processors, cause the one or more processors to perform:
  at a first access and mobility management function (AMF) (first AMF) in a network, receiving, from user equipment, a registration request listing a first network slice and a second network slice;
  at the first AMF, upon determining that the first AMF supports the first network slice, but not the second network slice, triggering an AMF selection procedure including:
    selecting, for the user equipment, (i) the first AMF as a Session and Mobility Management-AMF to operate in a full AMF role to perform registration, network slice authentication, securing context management, connection management, and mobility management, and first session management signaling for the first network slice and the user equipment, and (ii) a second AMF as a Session Management Only-AMF to operate in a limited AMF role to perform only second session management signaling for the second network slice; and
    notifying the first AMF and the second AMF respectively of designations as the Session and Mobility Management-AMF and the Session Management Only-AMF; and
  responsive to the designations, at the first AMF, acting as the Session and Mobility Management-AMF, performing the first session management signaling with a first session management function for a first data session on the first network slice, while the second AMF, acting as the Session Management Only-AMF, is performing the second session management signaling with a second session management function for a second data session on the second network slice, to provide the user equipment with access to the first network slice and the second network slice, concurrently.

19. The non-transitory computer readable media of claim 18, further comprising instructions to cause the one or more processors to perform:
  at the first AMF, but not the second AMF, performing the mobility management for the user equipment concurrently with the second AMF performing the second session management signaling.

20. The non-transitory computer readable media of claim 18, wherein the instructions to cause the one or more processors to perform selecting include instructions to cause the one or more processors to perform:
  sending, to a network slice selection function (NSSF) configured with mappings of network slices to AMF instances in the network that support the network slices, a Session and Mobility Management-AMF/Session Management Only-AMF selection request that identifies the first network slice and the second network slice, and indicates that the first AMF is configured to support the first network slice; and
  receiving, from the NSSF, indications that the first AMF is selected as the Session and Mobility Management-AMF and the second AMF is selected as the Session Management Only-AMF.

* * * * *